United States Patent
Caspar

(10) Patent No.: US 12,280,461 B2
(45) Date of Patent: Apr. 22, 2025

(54) ELECTRICAL DEVICE FOR ACTUATING A VACUUM CLEANER

(71) Applicant: Festool GmbH, Wendlingen (DE)

(72) Inventor: Moritz Caspar, Stuttgart (DE)

(73) Assignee: Festool GmbH, Wendlingen (DE)

( * ) Notice: Subject to any disclaimer, the term of this patent is extended or adjusted under 35 U.S.C. 154(b) by 103 days.

(21) Appl. No.: 18/122,219

(22) Filed: Mar. 16, 2023

(65) Prior Publication Data

US 2023/0219183 A1    Jul. 13, 2023

Related U.S. Application Data

(62) Division of application No. 16/619,826, filed as application No. PCT/EP2018/065099 on Jun. 7, 2018, now Pat. No. 11,691,234.

(30) Foreign Application Priority Data

Jun. 8, 2017 (DE) .......... 102017112706.2
Dec. 29, 2017 (DE) .......... 102017131457.1

(51) Int. Cl.
*A47L 7/00* (2006.01)
*A47L 9/28* (2006.01)
(Continued)

(52) U.S. Cl.
CPC ........ *B23Q 11/0046* (2013.01); *A47L 7/0095* (2013.01); *A47L 9/2884* (2013.01);
(Continued)

(58) Field of Classification Search
CPC ...... B23Q 11/0046; B25F 5/02; A47L 7/0095; A47L 9/2884; A47L 9/2894; H04W 76/10; H04W 76/14; G08C 17/02; G08C 2201/60
See application file for complete search history.

(56) References Cited

U.S. PATENT DOCUMENTS 9,241,270 B1    1/2016 Logue
9,756,402 B2 *  9/2017 Stampfl .................. B23Q 17/00
(Continued)

FOREIGN PATENT DOCUMENTS

DE    10 2012 003 073 A1    8/2013
DE       102012003077 A1 *   8/2013   ........... A47L 7/0095
(Continued)

OTHER PUBLICATIONS

IEEE Standard for information technology—telecommunications and information Exchange between systems—local and metropolitan area networks—specific requirements. Part 15:1: Wireless medium access control (MAC) and physical layer (PHY) specifications, Norm IEEE 802.15.1, ISBN 0-7381-4708-1, pp. 1-600, Jun. 14, 2005.

*Primary Examiner* — Thomas M Wittenschlaeger
*Assistant Examiner* — David G Shutty
(74) *Attorney, Agent, or Firm* — Hoffmann & Baron, LLP

(57) ABSTRACT

An electric device in the shape of a machine tool or an energy storage module for the electric power supply of a machine tool. The electric device has a wireless communication interface for wireless communication with an external communication apparatus, which forms part of a vacuum cleaner provided to suction dust generated by the machine tool and with the wireless communication interface being designed to send at least one control command to control the vacuum cleaner as a function of a switching status of the switching element to the external communication apparatus via a wireless control connection.

19 Claims, 7 Drawing Sheets

(51) Int. Cl.
*B23Q 11/00* (2006.01)
*G08C 17/00* (2006.01)
*G08C 17/02* (2006.01)
*H04W 76/10* (2018.01)
*H04W 76/14* (2018.01)
*B25F 5/02* (2006.01)

(52) U.S. Cl.
CPC ............ *A47L 9/2894* (2013.01); *G08C 17/02* (2013.01); *H04W 76/10* (2018.02); *H04W 76/14* (2018.02); *B25F 5/02* (2013.01); *G08C 2201/60* (2013.01)

(56) References Cited

U.S. PATENT DOCUMENTS

| | | | | |
|---|---|---|---|---|
| 9,980,127 | B2* | 5/2018 | Lee | H04W 52/04 |
| 10,484,526 | B2* | 11/2019 | Lee | H04M 1/7246 |
| 10,660,036 | B2* | 5/2020 | Lee | H04W 68/025 |
| 11,184,761 | B2* | 11/2021 | Russ | G08C 17/02 |
| 11,432,691 | B2* | 9/2022 | Caspar | G08C 17/02 |
| 11,471,013 | B2* | 10/2022 | Ed | G05D 1/028 |
| 2002/0161833 | A1* | 10/2002 | Niven | H04L 67/535 |
| | | | | 709/227 |
| 2004/0060145 | A1* | 4/2004 | Hayama | A47L 7/0085 |
| | | | | 15/353 |
| 2009/0241283 | A1* | 10/2009 | Loveless | A47L 9/2894 |
| | | | | 15/319 |
| 2010/0199453 | A1* | 8/2010 | Brotto | B23D 59/006 |
| | | | | 15/301 |
| 2014/0051359 | A1* | 2/2014 | Dina | H04W 4/80 |
| | | | | 455/41.2 |
| 2014/0151079 | A1 | 6/2014 | Furui et al. | |
| 2014/0304939 | A1* | 10/2014 | Suzuki | A47L 9/28 |
| | | | | 15/339 |
| 2016/0085253 | A1* | 3/2016 | Knight | G05B 15/02 |
| | | | | 700/19 |
| 2016/0100724 | A1* | 4/2016 | Valentini | A47L 9/2836 |
| | | | | 15/319 |
| 2016/0151846 | A1* | 6/2016 | Suzuki | A47L 7/0095 |
| | | | | 340/12.5 |
| 2016/0172722 | A1 | 6/2016 | Rejman et al. | |
| 2016/0173318 | A1* | 6/2016 | Ha | H04W 4/02 |
| | | | | 709/223 |
| 2016/0325391 | A1 | 11/2016 | Stampfl et al. | |
| 2017/0039845 | A1* | 2/2017 | Lim | H04W 4/50 |
| 2017/0193761 | A1* | 7/2017 | Suzuki | H04B 1/03 |
| 2017/0364360 | A1* | 12/2017 | Bessegato | B25F 5/00 |
| 2019/0089789 | A1* | 3/2019 | Doerner | H04L 67/141 |
| 2019/0207339 | A1* | 7/2019 | Suzuki | A47L 9/2868 |
| 2020/0281425 | A1* | 9/2020 | Saur | A47L 9/2894 |
| 2021/0037497 | A1* | 2/2021 | Rueckert | H04W 76/10 |
| 2021/0100417 | A1* | 4/2021 | Tauber | A47L 7/0095 |

FOREIGN PATENT DOCUMENTS

| | | |
|---|---|---|
| EP | 2 628 427 A2 | 2/2013 |
| EP | 2 628 431 A2 | 8/2013 |
| JP | H09-500049 A | 1/1997 |
| JP | 2014-156620 A | 8/2014 |
| JP | 2015-030060 A | 2/2015 |
| WO | 95/27432 A1 | 10/1995 |

\* cited by examiner

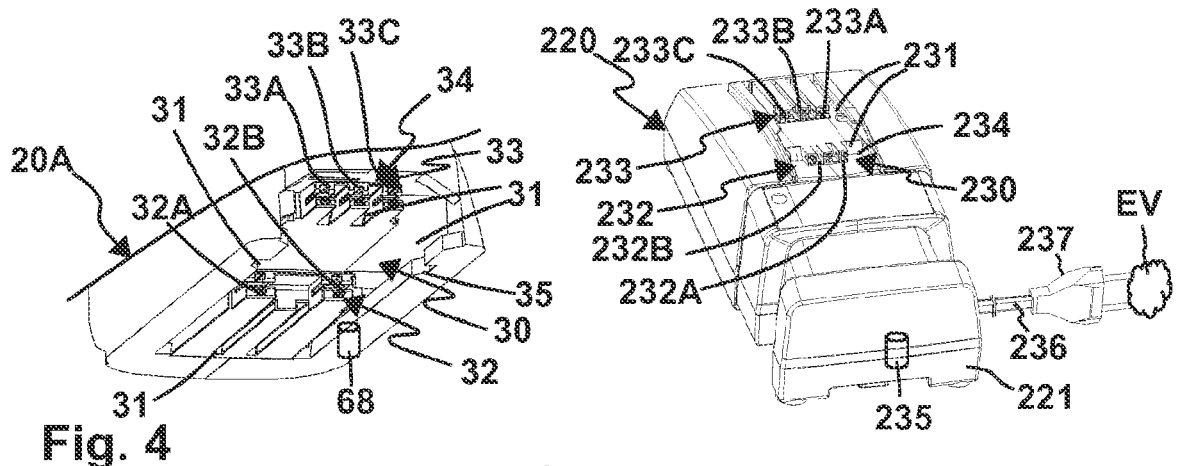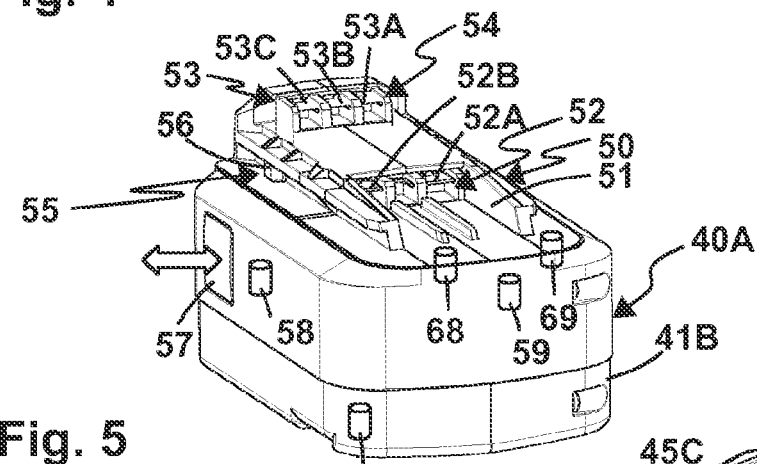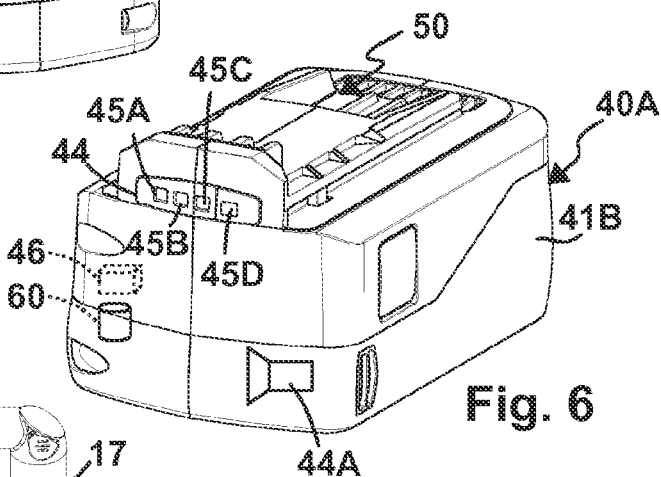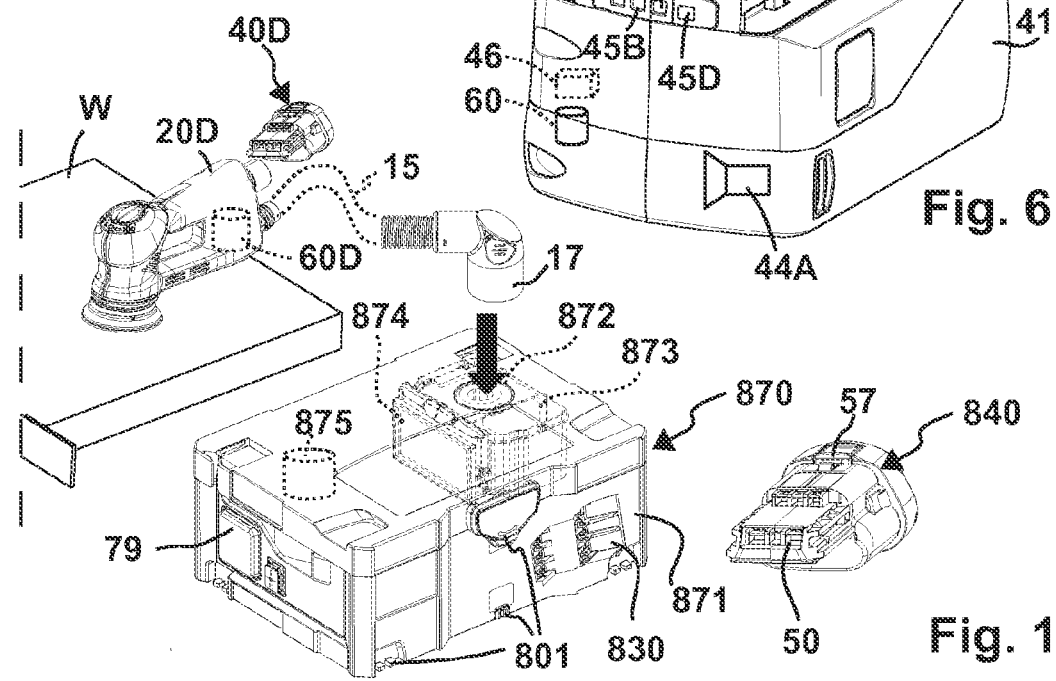

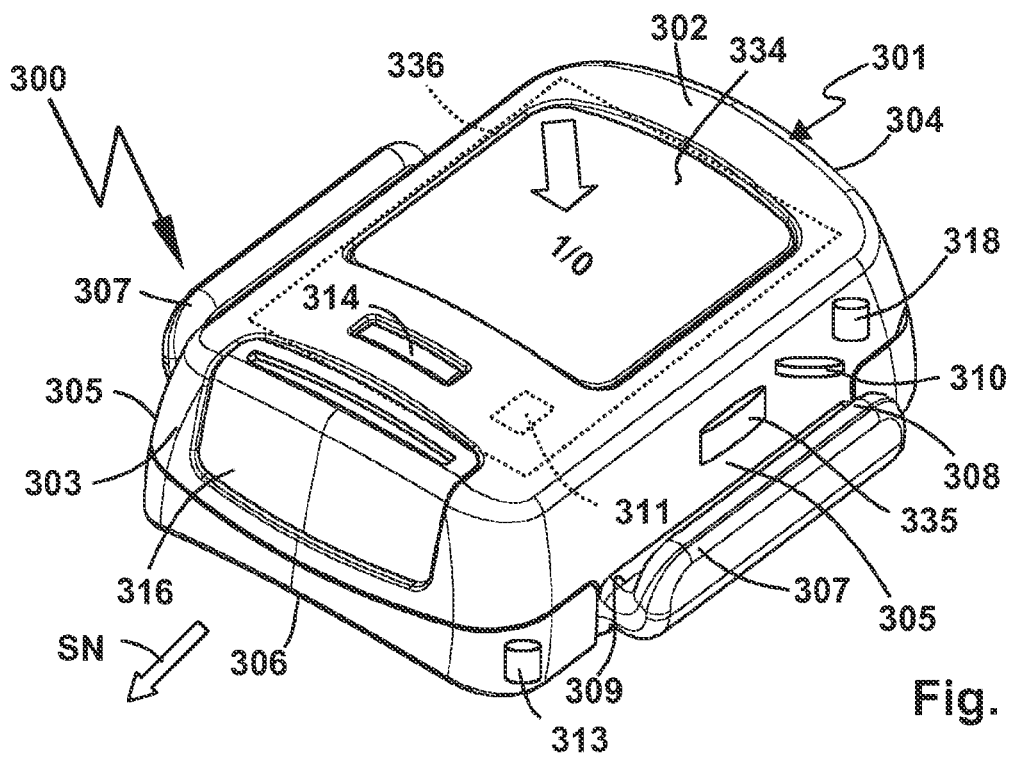
Fig. 8
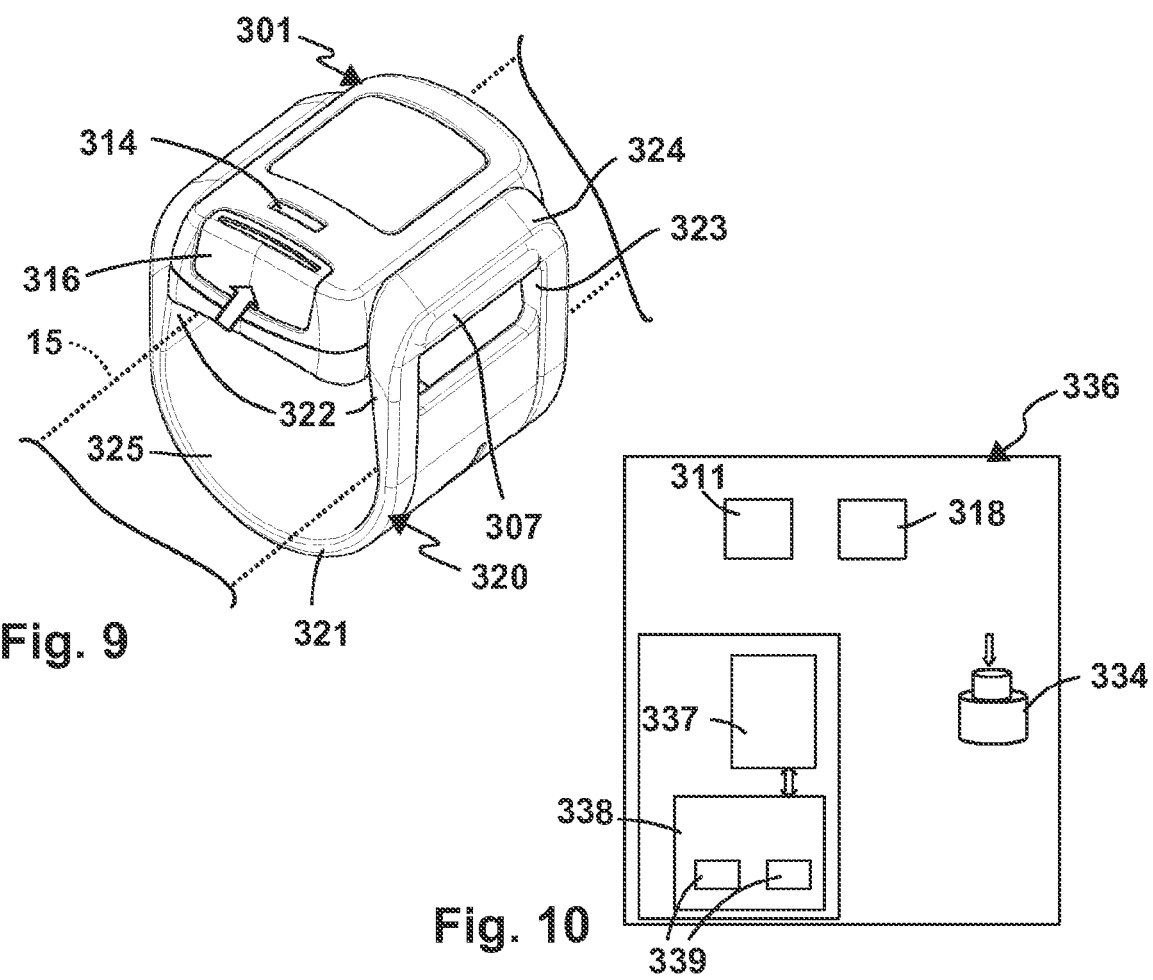
Fig. 9
Fig. 10

ELECTRICAL DEVICE FOR ACTUATING A VACUUM CLEANER

This application is a divisional application of U.S. application Ser. No. 16/619,826, filed on Dec. 5, 2019, which is a National Stage application based on PCT/EP2018/065099, filed Jun. 7, 2018, which claims priority to DE102017112706.2 filed Jun. 8, 2017 and DE102017131457.1 filed Dec. 29, 2017.

BACKGROUND OF THE INVENTION

The invention relates to an electric device in the shape of a machine tool or an energy storage module for the electric power supply of a machine tool, with the energy storage module having a module housing with a device interface for the detachable connection to the machine tool, with the machine tool having a drive motor to drive a tool holder on which a tool provided to process a workpiece is arranged or is arrangeable, with the drive motor being switchable using a switching element of the machine tool and/or the energy storage module, with the electric device having a wireless communication interface for wireless communication with an external communication apparatus, which forms part of a vacuum cleaner provided to suction dust generated by the machine tool and with the wireless communication interface being designed to send at least one control command to control, in particular to switch on and/or switch off the vacuum cleaner as a function of a switching status of the switching element to the external communication apparatus via a wireless control connection The invention also relates to an external communication apparatus as part of a vacuum cleaner, with the vacuum cleaner being actuatable by an electric device in the shape of a machine tool or an energy storage module for the electric power supply of a machine tool of the above type and being provided to suction dust generated by the machine tool, with the energy storage module having a module housing with a device interface for the detachable connection to the machine tool, with the machine tool having a drive motor to drive a tool holder on which a tool provided to process a workpiece is arranged or is arrangeable, with the drive motor being switchable using a switching element of the machine tool and/or the energy storage module, with the external communication apparatus being designed for wireless communication with a wireless communication interface of the electric device and being designed to receive at least one control command to control, in particular to switch on and/or switch off the vacuum cleaner as a function of a switching status of the switching element from the wireless communication interface via a wireless control connection.

A vacuum cleaner and an energy storage module of this type emerge for example from DE 10 2012 003 073 A1. When the hand-held machine tool is switched on, the energy storage module sends a corresponding switching signal to switch on the vacuum cleaner to the external communication apparatus of the vacuum cleaner. The system is also prone to faults because theoretically a plurality of electric devices of the same type, for example a plurality of electric devices located in the receiving range of the vacuum cleaner or the external communication device can switch on and switch off the vacuum cleaner. Switching off is in particular problematic because for example dust to be suctioned per se can, as a result, enter into the environment and as a result can lead not only to damage, but also to health impairments.

SUMMARY OF THE INVENTION

It is therefore the object of the present invention to provide an improved electric device in the shape of a machine tool or an energy storage module and an improved external communication apparatus.

In order to achieve the object, provision is made in the case of an electric device of the type mentioned at the beginning for the wireless communication interface to be designed to send at least one registration message to the external communication apparatus to establish the control connection to the vacuum cleaner as a function of a switching status of the switching element.

The switching status of the switching element triggering the registration message is for example a switch-on actuation to switch on the drive motor of the machine tool.

A method provides for an electric device in the shape of a machine tool or an energy storage module for the electric power supply of a machine tool, with the energy storage module having a module housing with a device interface for the detachable connection to the machine tool, with the machine tool having a drive motor to drive a tool holder on which a tool provided to process a workpiece is arranged or is arrangeable, with the drive motor being switchable using a switching element of the machine tool and/or the energy storage module, with the electric device having a wireless communication interface for wireless communication with an external communication apparatus, which forms part of a vacuum cleaner provided to suction dust generated by the machine tool and with the wireless communication interface being designed to send at least one control command to control, in particular to switch on and/or switch off the vacuum cleaner as a function of a switching status of the switching element to the external communication apparatus via a wireless control connection. The wireless communication interface sends at least one registration message to the external communication apparatus to establish the control connection to the vacuum cleaner as a function of a switching status of the switching element.

The electric device can for example be an energy storage module which provides the wireless communication with the external communication apparatus. The electric device may, however, also be the machine tool itself, for example a screwing machine, a drilling machine, a saw, a mill or the like. The machine tool is expediently a hand-held machine tool.

In the case of the electric device, provision is advantageously made for the device interface to have plug positive-locking contours to plug in plug counter positive-locking contours of the other device interface along a plug axis and electric contacts, in particular supply contacts, for contacting with electric counter contacts of the other device interface for an electric connection between energy storage module and machine tool or vacuum cleaner, which enter into electric contact with one another in the case of a plug-in assembly of the plug positive-locking contours and the plug counter positive-locking contours.

It is preferably provided that the energy storage module has a module housing and an energy storage device received in the module housing, in particular an arrangement with at least one rechargeable electric storage cell to provide electric energy for the energy supply of the machine tool or the supply contacts provided for the vacuum cleaner.

In order to achieve the object, provision is made, in the case of an external communication apparatus of the type mentioned at the beginning provided for communication with the electric device, for it to be designed to receive at least one registration message from the wireless communication interface to establish the control connection. The wireless communication interface of the electric device sends the at least one registration message to the external communication apparatus to establish the control connection to the vacuum cleaner advantageously as a function of a switching status of the switching element. The external communication apparatus can be designed as a module removable from the vacuum cleaner or form a fixed part of the vacuum cleaner. The vacuum cleaner has for example a module holder for the external communication apparatus.

The registration message preferably for example comprises an authorisation parameter and/or an identification value of the hand-held machine tool and/or the energy storage module or the like. A basic concept is that only using the switching element, with which the machine tool is switched on, the registration of the electric device can take place at the external communication apparatus. A separate operating button or another operating element is not necessary in the case of the electric device.

An identification value contained in the registration message or an authorisation parameter contained therein can for example already be stored at the external communication interface such that the external communication interface, for example the vacuum cleaner itself, can identify that a device currently authorised or suitable for establishing the control connection wishes to establish the control connection. It may for example be provided that using software parameterisation via parameterising interface, for example a USB interface, a parameter contained in the registration message and identifying or authorising the electric device, for example the authorisation parameter, is parameterisable at the external communication interface. However, it is also possible that at least one such parameter is stored through establishing a previous control connection at the external communication interface and to be retrieved again.

Provision is preferably made for the wireless communication interface to be designed to send the at least one registration message to the external communication apparatus before the first sending of the at least one control command to the external communication apparatus. In this case, provision is made for the electric device to so to speak always firstly carry out a registration prior to sending a respective control message or a control command. Thus, when for example the electric device is switched on for the first time or for example the energy storage module identifies the switching-on of the machine tool, i.e. the actuation of the switching element, the registration message is as a result firstly triggered, i.e. the registration to establish the control connection at the external communication apparatus.

In principle, it is possible, but not absolutely necessary, for the electric device for example the machine tool and/or the energy storage module, to have an operating element provided or suitable for triggering the registration message, for example a button or the like. It is also possible that the at least one registration message or the registration procedure is triggered by another measure, for example by an initial arrangement of the energy storage module on the machine tool. However, provision is preferably made for the electric device, aside from the switching element, not to have an operating element provided or suitable for triggering the registration message.

In the case of the external communication apparatus, it is accordingly advantageous when it only accepts control commands when a registration message was previously received or the control connection has effectively been established.

An expedient measure provides for the wireless communication interface to be designed for encrypted and/or authenticated communication with the external communication apparatus, in particular for sending the at least one control command to the external communication apparatus. It is also correspondingly advantageous for the vacuum cleaner or the external communication apparatus to also be designed for encrypted and/or authenticated communication. The control connection is in particular such a control connection which is always encrypted and/or authenticated. As a result, an unauthorised device switching on into the control connection or being improperly operated in another manner is avoided or in any case ruled out with a high degree of probability. In the case of a vacuum cleaner, in principle relatively few error functions can be triggered, except for it being switched on or switched off. In principle therefore, a simple security standard is sufficient. Encryption still protects against misuse. A security standard for example in the manner of the Diffie-Hellman-Key-Exchange, in particular in relation to a control connection based on Bluetooth is expedient. In particular a so-called cryptographic authentication is advantageous. A registration key is preferably agreed at first registration.

Provision is advantageously made for the wireless communication interface to be designed to send a status request to request an operating status, in particular a switching status of the vacuum cleaner to the external communication apparatus and/or to receive a status message containing an operating status, in particular a switching status of the vacuum cleaner. Accordingly, it is advantageous for the external communication apparatus to also be designed to send an operating status or status message. The external communication apparatus understands so to speak the status request with which the electric device and in particular its wireless communication interface requests the operating status of the vacuum cleaner. The operating status may for example be information about whether or not the vacuum cleaner is running, what speed it has, what performance data the vacuum cleaner has or the like.

It is preferred for the electric device to have a display device, for example an optical display device, an acoustic display device or both to output at least one communication information item relating to the control connection and/or to display an operating status, in particular an establishment of the control connection. The display device for example comprises a speaker, a light display, an LED display, an LCD display or the like. The communication information can for example relate to the current situation or status of the control connection. Using the optical or acoustic information of the display device, the operator can for example identify that the control connection will be established or is established.

It is particularly preferred for the display device to form part of a charging status display of the energy storage module, with the charging status display being provided and/or designed to display an energy capacity or charging capacity present in the energy storage module. The charging status display is thus so to speak still used to output the communication information or the operating status in regard to the control connection. Thus, for example a first colour at the optical display serves to display the charging status, while a colour serves to output the communication information or the operating status or both. Different optical characterisations, for example optical display patterns, both of a chronological or also graphic type, can also serve for the display device to display both the energy capacity or the charging status and also the communication information and/or the operating status of the control connection. It is preferred when the electric device is designed to enter at least one temporary identifier into the at least one registration message, with the temporary identifier characterising the control connection that it is wireless. Other control connections, which can be established with the external communication apparatus, are for example permanent control connections.

Provision is preferably made for the wireless communication interface to be designed to iteratively send a control command provided to switch on the vacuum cleaner and/or to maintain the control connection, provided the switching element is in a switching position switching on the drive motor. The wireless communication interface thus can for example send empty data packets which signal to the receiving external communication apparatus that the data connection or the control connection is intact. Furthermore, it is possible that the switching command is sent repeatedly to switch on the vacuum cleaner.

In the case of the external communication apparatus, provision is preferably made for it to end a suction operation when the control connection is interrupted and/or it does not obtain any control command within a predetermined or predeterminable or settable time from the electric device. Thus, for example when switch-on signals no longer arrive at the external communication apparatus or it identifies that the control connection is broken off, it switches off the suction operation at the vacuum cleaner.

However, in principle, it is also possible that the vacuum cleaner itself continues running in the case of interrupted or broken-off control connection such that in any case a reliable suction operation itself is ensured in the case of interrupted control connection or disrupted control connection.

The electric device or its wireless communication interface are expediently designed to receive a registration confirmation message confirming the control connection. Accordingly, the external communication apparatus is expediently designed to send a registration confirmation message confirming the control connection. The electric device so to speak is registered at the external communication apparatus to establish the control connection which the external communication apparatus accordingly confirms with the registration confirmation message.

Furthermore, it is preferred when the electric device is designed to store an address identifier of the external communication apparatus. In this case, it is preferred when the electric device can store a plurality of external communication apparatuses or their address identifiers. Therefore, the electric device can be registered for example very quickly at different, for example at least two external communication devices. The device so to speak reads the memory and registers at an external communication apparatus or a vacuum cleaner known to it.

It is preferred for the electric device or its wireless communication interface to be designed to send at least one configuration message for the configuration, for example the configuration of a working position and/or suction power, of the external communication apparatus or the vacuum cleaner as a function of a variable characterising the electric device. The variable characterising the electric device can for example comprise one or a plurality of the following variables: The type of electric device (saw, mill or the like), dust class, speed setting of the drive motor of the electric device, current power consumption of the electric device, contact pressure of the device, measured dust concentration or the like.

A preferred embodiment of the invention provides for the electric device to be designed as an energy storage module for the supply of the machine tool, which has the switching element, with the device interface having electric device supply contacts for the electric energy supply of the machine tool, with energy storage module determining information about the switching status of the switching element via a data interface separate from the device supply contacts, in particular a bus interface, and/or using a detection of a current flow via the device supply contacts. Therefore, the energy storage module does not itself have the switching element on board, but rather detects the switching status of the switching element of the machine tool. In the simplest case, for example a current flow, which flows via the device supply contacts, is to be detected. However, data communication via a data interface, for example a bus interface, can also serve to determine the switching status. Thus, when for example the machine tool sends a switch-on signal via the data interface, i.e. that for example the drive motor of the machine tool is switched on, this is evaluated by the energy storage module in order to carry out the registration at the external communication apparatus and/or to switch on the vacuum cleaner, i.e. to send control commands. It is also possible that alone due to an initialisation communication between the energy storage module and the machine tool the switching status of the switching element can be determined. Thus, when the operator actuates the switching element, i.e. wishes to switch on the drive motor, the machine tool for example requests typical information at the energy storage module, e.g. a current charging status, a maximum supply voltage or the like. Only then is the drive motor switched on. Owing to this request, the energy storage module can identify that the switching element of the machine tool is actuated.

It should also be mentioned that a control command to switch off the vacuum cleaner is preferably firstly given after a stopping time, i.e. that for example after a releasing the switching element of the machine tool, the control command is only sent with a delay to switch off the vacuum cleaner. Therefore, an effective and subsequent suction of dust generated or generatable by the machine tool is ensured.

Furthermore, it is advantageous when the electric device or its wireless communication interface is designed to separate the control connection in the case of an operational interruption, for example separation of the energy storage module and the machine tool from one another and/or in the case of charging the energy storage module on a charging device and/or after a predetermined time. The electric device thus for example signals to the external communication apparatus that the control connection is no longer required. The predetermined time can for example comprise one hour or two hours. Thus, when the electric device is not used for a longer time, it so to speak terminates the control connection such that the external communication apparatus or the vacuum cleaner is ready to build or establish other control connections with other electric devices. In the case of the external communication apparatus, an authorisation parameter is for example stored for the electric device, which qualifies the electric device as a device entitled or authorised to establish or maintain or use the control connection. The external communication apparatus can for example reset or erase the authorisation parameter for example in the case of the operational interruption.

It should be noted at this point that of course the external communication apparatus can also identify an operational interruption, for example when a switch-on message is no longer received from the electric device for a predetermined time. The control connection is then for example suspended at the energy storage module when it is charged on a charging device. In this case, it is possible that the electric device so to speak actively enables the control connection. Thus, when for example the energy storage module is separated from the machine tool or connected to a charging device (or both), it can send a termination message to terminate the control connection to the external communication apparatus.

A preferred concept provides, in the case of the external communication apparatus, that the respectively first electric device, which wishes to establish the control connection using the registration message, may also establish the control connection. Thus, for example two concurring electric devices in the shape of machine tools can attempt to establish in each case one control connection to the vacuum cleaner or the external communication apparatus. The respectively first electric device is accepted in this case by the external communication apparatus or the vacuum cleaner.

In the case of the external communication apparatus or the vacuum cleaner, it is advantageously provided that it is ready in a standby mode to receive the at least one registration message and it is not ready in an operating mode to receive the at least one registration message. In the so to speak normal operating module, a control connection may already exist. In the standby mode in contrast, it is possible that a control connection is established, with which the electric device can actuate the external communication apparatus or the vacuum cleaner.

In the case of the external communication apparatus or the vacuum cleaner, it is expediently provided that it can be switched using a registration operating element into the standby mode and/or that it switches into the standby mode after connecting the vacuum cleaner to an electric energy supply for the vacuum cleaner. The registration operating element may for example be an operating button or an operating switch. The vacuum cleaner or the external communication apparatus has for example a type of authorisation button. When the operator actuates the operating element, the standby mode is active or can be activated. However, it is also possible that after connecting the vacuum cleaner or the external communication apparatus to an electric energy supply, for example to an energy supply network using a power cable or to a battery pack or to another energy storage module, the external communication apparatus or the vacuum cleaner or both switches into the standby mode, for example from the normal operating mode per se. Thus, for example when the operator connects the vacuum cleaner with a connection cable to a power outlet or plugs in a battery pack, the vacuum cleaner is ready so to speak for the control connection, namely in the standby mode. The standby mode can, on the one hand, be ended by a time condition, but, on the other hand, also be active. Thus, for example a separation of the external communication apparatus or the vacuum cleaner from an electric grid is a trigger for ending the standby mode. However, it is also possible that the operator actuates one operating element, for example an operating element provided especially for ending the standby mode and/or the registration operating element in order to so to speak actively end the standby mode.

It is advantageously provided that the external communication apparatus has optical and/or acoustic display means to display the standby mode. For example, an LED illuminates and/or a speaker generates a corresponding signal. The operator identifies that the standby mode is switched on. It is also possible that display means are so to speak multifunctional on the vacuum cleaner or the external communication apparatus. Thus, a display means can be provided which displays in a first operating mode operating statuses of the vacuum cleaner, for example fill level, a necessary vacuum cleaner bag change or the like, while in a second operating module the display means display the standby mode.

Furthermore, it is advantageous for the external communication apparatus or the vacuum cleaner to end the standby mode after a predetermined or determinable time. For example, provision can be made such that, after actuating the registration operating element and/or connecting the vacuum cleaner to a power supply or energy supply, the standby mode is active and after a predetermined time, for example 20 seconds or 40 seconds, one minute or the like, the standby mode is again ended. By re-actuating the registration operating element and/or removing and reconnecting the electric energy supply, the standby mode can be reactivated.

A variant of the invention can provide that the external communication apparatus or the vacuum cleaner is designed in the standby mode at least one request message to request the electric device to send the at least one registration message to the external communication apparatus. This may be a so-called broadcast message. Thus, when for example in the case of the external communication apparatus, no electric device, in particular no machine tool, is currently registered to switch on and/or switch off the vacuum cleaner, it sends the request message.

A different scenario can be provided that the external communication apparatus sends a broadcast request to establish the control connection to suitable or ready devices, i.e. energy storage modules or machine tools or both after a predetermined waiting time, for example of one or a number of seconds, in which no registration message or no response message comes from an electric device already authorised.

It should be mentioned at this point that of course the electric device or its wireless communication interface can also send one or a plurality of registration messages to establish a control connection to external communication devices standing by or ready (for example in the standby mode). The wireless communication interface or the electric device thus attempts, when no connection to an external communication apparatus or a vacuum cleaner is present, to establish a control connection to another vacuum cleaner.

In the case of the external communication apparatus or the vacuum cleaner, it is expediently provided that it is designed to establish the control connection with the electric device as a control connection of a temporary category and preferably to establish at least one wireless control connection with an operating device in a permanent category. The basic concept here is that the electric device so to speak is registered only temporarily at the external communication apparatus. In this case, it is advantageous when a registration to a controller is possible in a permanent manner, for example using a remote control device. Therefore, a wireless controller both of a temporary type and a permanent type is also possible. In this context, it is advantageous for only a single wireless control connection of the temporary category to be possible with the external communication apparatus or the vacuum cleaner.

Furthermore, it is advantageous when, in the temporary category, only one device is reserved for actuating the vacuum cleaner from the category of machine tools, for example hand-held machine tools and/or energy storage modules for machine tools. Therefore, a remote control device, which is not designed as a machine tool or as an energy storage module, cannot register temporarily at the external communication apparatus.

Advantageously, in the case of the external communication apparatus or the vacuum cleaner, provision is made for a first operating action at the external communication apparatus to be required to establish the wireless control connection of the temporary category and the wireless control connection of the permanent category to be able to be established by a second operating action different compared to the first operating action, in particular more difficult and/or to be established or able to be established by a permanent setting, in particular a setting using an electric registration operating element or using a setting settable by software. For example, provision can be made for the first operating action to be an operating action on a registration operating element arranged in a concealed manner. The operating action can for example be made difficult as a result of the registration operating element being concealed under a cover, inside the housing of the external communication apparatus or the vacuum cleaner or the like. Furthermore, the first operating action may require an operating actuation of an operating element deviating and/or longer compared to the second operating action. Thus, for example it is also conceivable for the vacuum cleaner or the external communication apparatus to have to be connected firstly to an energy supply to register a control connection of the permanent category and also for an operating actuation to still be required on a registration operating element.

It is also necessary for the first and the second operating action to take place on one and the same registration operating element, but be different. Thus, for example the operating action for the registration of the control connection of the temporary category may require a short key stroke on the registration operating element while the permanent control connection can only be established when the operating element has to be operated or pressed or actuated for a predetermined time period that is longer compared to the first operating action.

The operating action can also comprise the detecting of a wireless identification transmitter, for example an RFID transmitter.

In order to establish a control connection of the permanent category, for example an additional identification transmitter is necessary which sends identification data of the device to the external communication apparatus which wishes to establish the permanent control connection.

Expediently, in the case of the external communication apparatus or the vacuum cleaner, provision is made for it to end the, in particular temporary control connection with the electric device after a predetermined or settable time and/or in the case of an operational interruption of the vacuum cleaner, in particular in the case of switching off the vacuum cleaner and/or in the case of separating the vacuum cleaner from an electric energy supply. The use of the electric device with the external communication apparatus can be re-established only by a re-registration using the at least one registration message. The vacuum cleaner can for example be separated from a power supply or switched off at a switching element. In this case, the temporary control connection or even the control connection with the electric device is interrupted or ended. Of course, the control connection can be subsequently re-established, e.g. by the at least one registration message.

A preferred concept provides for the external communication apparatus to measure so to speak the distance from at least two electric devices according to the invention in order to preferably allow the electric device arranged closest to the external communication apparatus or the vacuum cleaner to establish the control connection. A preferred embodiment of the invention makes provision such that the external communication apparatus is designed to establish the control connection as a function of a signal strength of a signal sent by the wireless communication interface, in particular containing the at least one registration message, with the external communication apparatus signalling the wireless communication interface in the case of a signal strength, which exceeds a first signal threshold, in particular a distance between the wireless communication interface and the external communication apparatus of less than 1 m, to prioritise the registration message for an immediate or preferred establishment of the control connection and/or to prefer, in the case of electric devices concurring with one another, the electric device with the highest signal strength to establish the control connection. Thus, for example in the case of a signal strength measurement, which signals a distance between the external communication apparatus or the vacuum cleaner and the wireless communication interface or the electric device of less than one meter, an immediate registration is possible. At a greater distance, for example of one meter to 10 meters, between the electric device and the vacuum cleaner, a longer waiting time is preferably provided for receiving the registration message.

It is also possible that the external communication apparatus responds at different speeds to registration messages as a function of their signal strength. It is for example preferred for the external communication apparatus to set a response time to send a response, for example a registration confirmation message, to the registration message as a function of the signal strength of the signal of the wireless communication interface. When the external communication apparatus thus receives a first registration message with a first signal strength, it responds with its response, for example the registration confirmation or a request to send further data, more quickly than in the case of a second registration message with a second signal strength which is lower than the first signal strength. Consequently, the suction device for example responds, in the case of a registration with a strong signal, quicker than in the case of a registration with a weak signal.

A signal strength can be indicated in a message communicating via the control connection to be initiated between the electric device and the vacuum cleaner, for example the registration message or a response message or both. The signal strength is so to speak the base measurement which is analysed in the case of the reception strength measurement or transmission strength measurement by the respectively receiving device, i.e. the vacuum cleaner or the electric device.

It is expediently provided that the control connection that can be established with the electric device is an exclusive temporary control connection such that the vacuum cleaner can be actuated exclusively via the temporary control connection and optionally using at least one operating element arranged locally on a vacuum cleaner housing of the vacuum cleaner and/or operating element communicating wirelessly with the vacuum cleaner and not designed as a machine tool or its energy storage module. The operating element is for example a switching element to switch on or switch off the vacuum cleaner, a speed controller or the like.

The vacuum cleaner can be advantageously wirelessly actuated, besides by at least one operating device registered permanently at the vacuum cleaner for wireless communication, exclusively by the electric device, i.e. the machine tool or the energy storage module.

In the case of the vacuum cleaner or the external communication apparatus, provision is preferably made for it to end a suction operation when the control connection is interrupted and/or it does not obtain any control command within a predetermined or determinable time from the electric device. This is for example understood as a signal that the electric device no longer needs the vacuum cleaner. The determinable time can for example be set on a switching element, which is arranged on the housing of the external communication apparatus or the vacuum cleaner. However, a parameterisation of the time by software, via radio or the like is also readily possible.

The external communication apparatus is expediently designed to receive at least one configuration message for the configuration, in particular the configuration of a working position and/or suction power, of the external communication apparatus, in particular the vacuum cleaner as a function of a variable characterising the electric device. Working position is preferably settable directly in relation to the registration procedure to establish the control connection.

The external communication apparatus and/or the vacuum cleaner expediently has a memory to store authorisation parameters or registration parameters and/or encryption parameters, in particular encryption parameters assigned to the authorisation parameters or registration parameters, to establish control connections to at least two electric devices and their wireless communication interfaces. Therefore, the external communication apparatus and/or the vacuum cleaner can already hold authorisation parameters or registration parameters and expediently also encryption parameters, in particular those assigned to the authorisation parameters or registration parameters. Thus, when the electric device is registered at the external communication apparatus, the external communication apparatus already knows using the stored authorisation parameters or registration parameters that the electric device is entitled or authorised to establish the control connection. When encryption parameters, for example for the encryption already mentioned above, are present or stored at the vacuum cleaner or the external communication apparatus, the encryption can also be re-established very quickly.

It should be mentioned at this point that of course the electric device, the machine tool and/or the energy storage module and in particular the wireless communication interface can have a memory to store a plurality of registration parameters, for example keys, identification values and/or encryption parameters, for example encryption keys, for registration at at least two external communication apparatuses or vacuum cleaners different from one another.

The respective memory is preferably a permanent memory, which itself is not erased in the case of an operational interruption or interruption of the current supply of the external communication apparatus or of the vacuum cleaner. However, it is also possible that the memory is a volatile memory.

At least one other information item is expediently also stored in the memory of the external communication apparatus or another memory, for example performance data of the electric device in the shape of the machine tool and/or the energy storage module. However, it is also advantageous to store for example performance data of the vacuum cleaner or the like in a memory or the memory of the electric device.

A preferred concept, in the case of the external communication apparatus and/or the vacuum cleaner, provides for it to be actuatable by at least one remote control device in addition to the at least one control connection. The remote control device is for example arranged remotely in a housing separate from the vacuum cleaner housing. The remote control device can, however, also be arranged on a suction hose of the vacuum cleaner. A mobile remote control device, which is separate from the vacuum cleaner, is in any case preferred. The communication parameters or registration parameters of the remote control device are expediently permanently stored at the external communication apparatus. The remote control device expediently belongs to the permanent category according to the above description. An embodiment of the remote control device can provide that it is arranged or is arrangeable as an additional module on the hand-held machine tool, the machine tool or the energy storage module. The operator can thus immediately use the remote control device to actuate the vacuum cleaner.

The external communication apparatus and/or the vacuum cleaner is advantageously designed to prioritise at least one control command generated by a control operating element different from the electric device to control, in particular switch on and/or switch off the vacuum cleaner with respect to the control connection, with the control command forming a priority control command. Therefore, the external communication apparatus or the vacuum cleaner is thus actuatable as a priority by the control operating element. The control operating element may for example be an outlet, which is designed to detect a current flow carried via said outlet. When a consumer, for example another machine tool, is connected to the outlet, this is detected in the outlet. For example, a so-called shunt or a so-called measuring unit is arranged on or in the outlet which detects the current flow. The device connected locally to the outlet of the vacuum cleaner, for example a grinding device, a saw or the like thus leads to a priority switching-on or switching-off of the vacuum cleaner. The control operating element may, however, also be switch which is arranged on the vacuum cleaner housing. Using the switch, the vacuum cleaner can be switched on and switched off irrespective of which commands come via the control connection from the electric device according to the invention connected in particular temporarily to the vacuum cleaner.

A preferred embodiment provides for the already mentioned remote control device, consequently a remote control device assigned to the vacuum cleaner or forming a part of the vacuum cleaner to be able to give control commands as a priority which are processed or handled by the vacuum cleaner or the external communication apparatus in a preferred manner compared to the control commands of the electric device actuating via the control connection according to the invention.

It is preferably provided that the energy storage module has a module housing and an energy storage device received in the module housing, in particular an arrangement with at least one rechargeable electric storage cell to provide electric energy for the energy supply of the machine tool or the supply contacts provided for the vacuum cleaner. The electric storage cells, in particular a grouping or an arrangement of a plurality of electric storage cells are for example chargeable by a charging device. However, it is also possible that the energy storage device has for example a fuel cell or the similar other electric storage device or chemical storage device which can provide electric energy at the end.

The energy storage module expediently has a module housing with a device interface for the detachable connection to the machine tool. The device interfaces of the energy storage module to the machine tool or the vacuum cleaner have supply contacts suitable for one another to transfer electric energy and/or data contacts, in particular bus contacts to transmit data.

The machine tool is a machine tool generating dust and/or particles, for example a sawing machine, a drilling machine, a milling machine, a grinding machine or the like. In particular, the machine tool is a hand-held machine tool. The machine tool expediently has a suction outlet, for example a connection fitting to connect a suction hose.

The vacuum cleaner could also be generally designated as a vacuum device. The vacuum cleaner can itself of course not only vacuum dust, but rather also coarser particles which the machine tool generates.

It is preferred for the control connection to only be establishable or established when the vacuum cleaner and the machine tool are flow-connected to one another using the suction hose or a suction hose.

Sensors or detection means can be provided on the machine tool and/or the vacuum cleaner which identify the connection of the suction hose. Only if a suction hose is actually connected, will the control connection be established.

BRIEF DESCRIPTION OF THE DRAWINGS

Embodiments of the invention are explained below using the drawings. These show.

DETAILED DESCRIPTION

Figure 1:
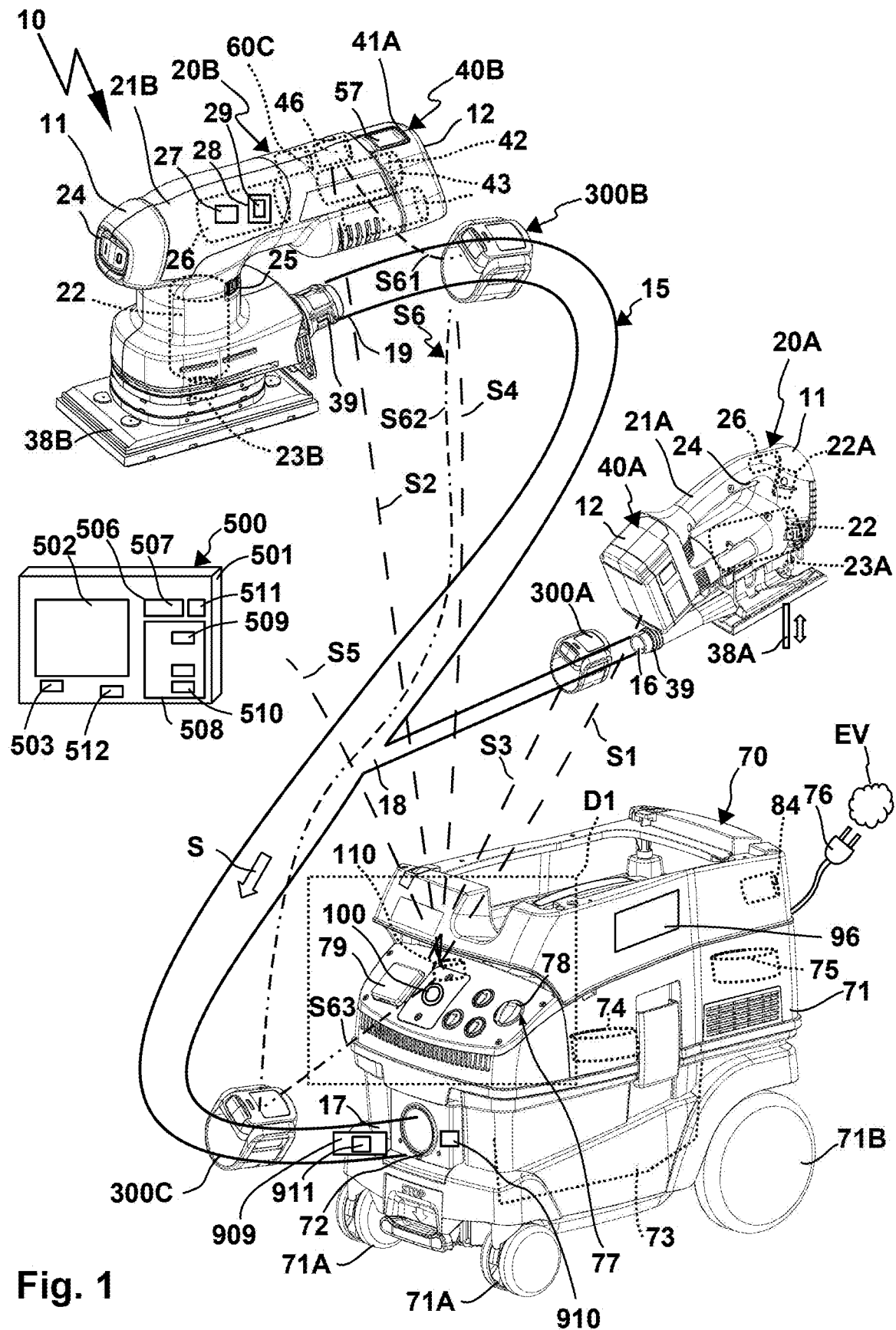
FIG. 1 a perspective oblique view of a system according to the invention comprising a hand-held machine tool and a vacuum cleaner, FIG. 2 a partial view roughly corresponding to a detail D1 of the vacuum cleaner according to FIG. 1, FIG. 3 a perspective oblique view of a communication module of the vacuum cleaner according to FIG. 1, FIG. 4 a device interface of a machine tool according to FIG. 1, FIG. 5 an energy storage module of the system according to FIG. 1 represented in a perspective oblique manner, FIG. 6 the energy storage module according to FIG. 5 represented perspectively from another side, FIG. 7 a charging device to charge the energy storage module according to FIGS. 5, 6, FIG. 8 a communication module of the system according to FIG. 1 in a perspective oblique view, FIG. 9 the communication module according to FIG. 8, but with a fastening device for fastening on a schematically represented suction hose, FIG. 10 a schematic functional representation of the communication module according to FIG. 9, 10, FIG. 11 a schematic circuit diagram of the energy storage module and a hand-held machine tool and a communication module according to FIG. 1, FIG. 12 a schematic circuit diagram of the energy storage module according to FIG. 4 in cooperation with the charging device according to FIG. 7, FIG. 13 a perspective representation of the other energy storage module according to FIG. 1 in the status put on the charging device according to FIG. 7, FIG. 14 a communication diagram between the vacuum cleaner according to FIG. 1 and an energy storage module, FIG. 15 a schematically represented system with a vacuum cleaner arranged in a transport box and operable with an energy storage device, FIG. 16 a diagram with a relation between signal strength information and a response time.
Figure 2:
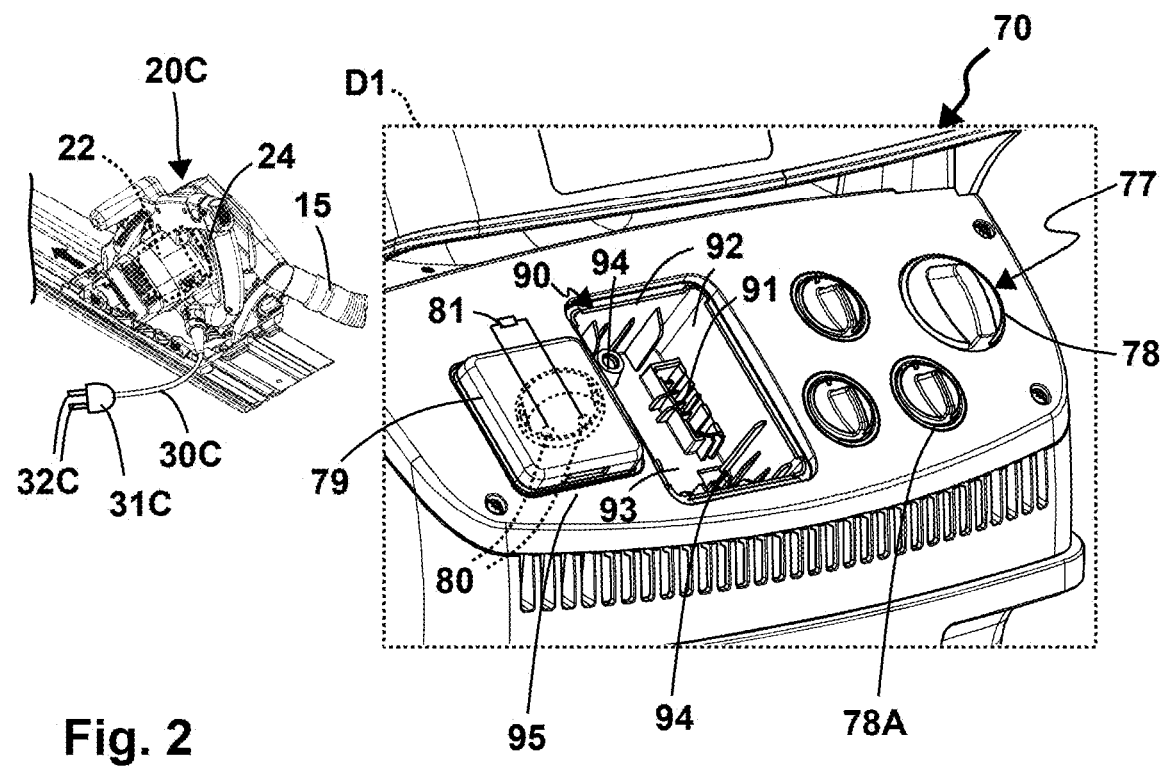
Figure 3:
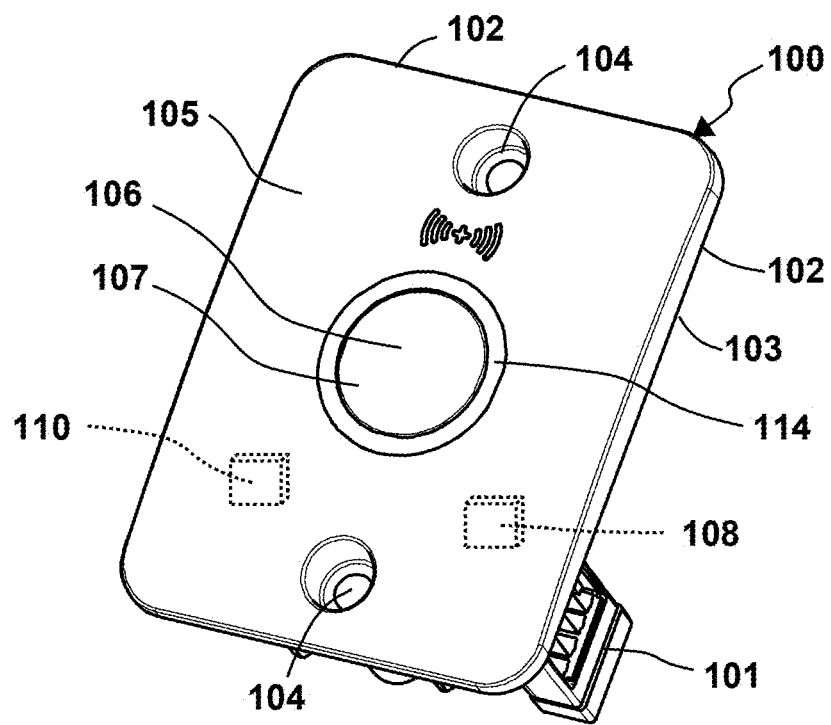
Figure 11:
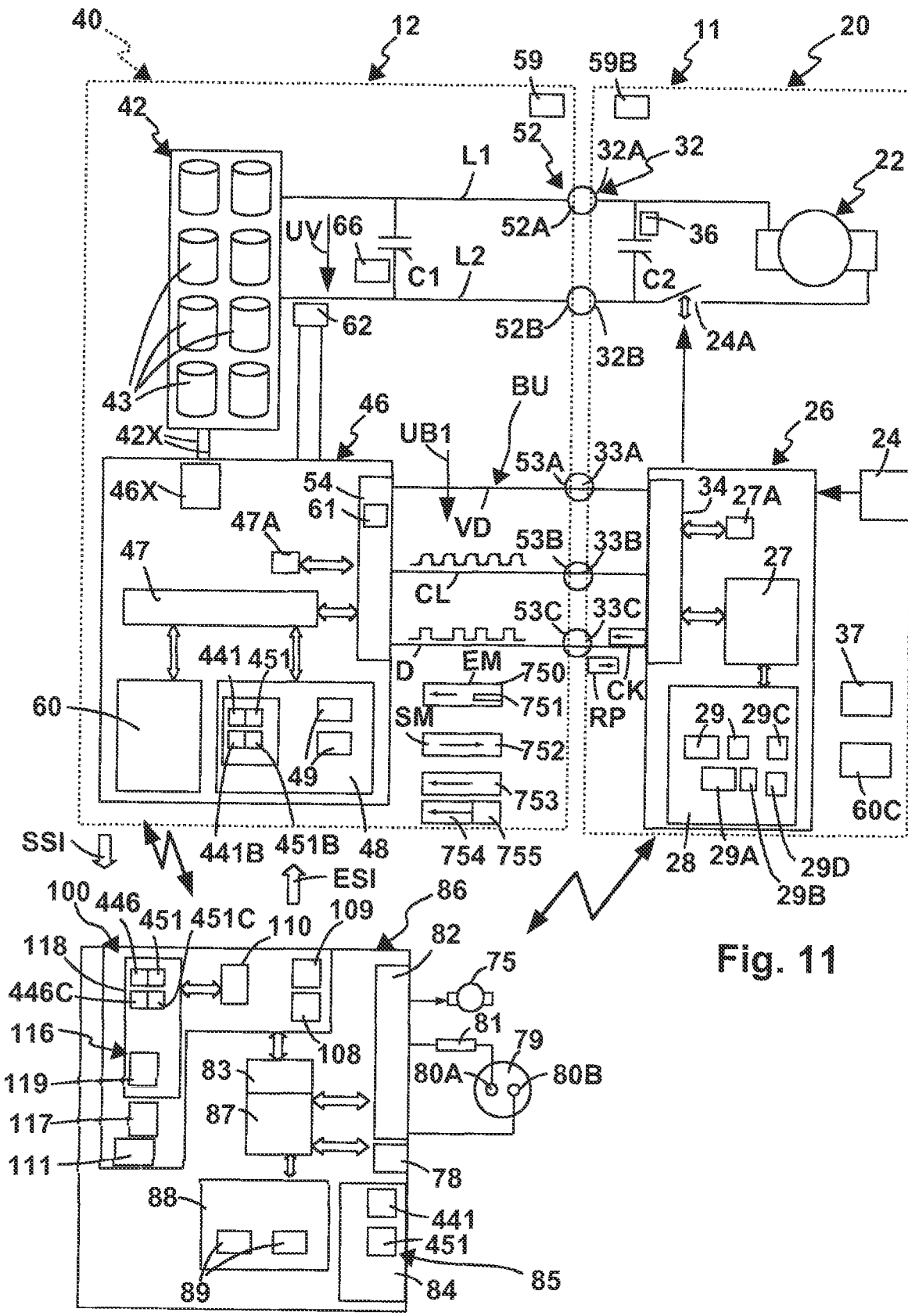

Identical and similar components are provided below in part with the same or similar reference numerals marked with the addition of A, B etc.

A system 10 partially schematically represented in FIG. 1 comprises machine tools 20A, 20B which are supplied with electric energy by energy storage modules 40A, 40B. The machine tools 20A, 20B are machine tools generating dust or particles and in particular hand-held machine tools. The machine tool 20B is for example a grinding device, the machine tool 20A is a saw, in particular a jigsaw, with a router or similar other electric machine tool or hand-held machine tool generating dust or particles also being readily possible.

A drive motor 22 is arranged in a machine housing 21A, 21B of the machine tool 20A, 20B which is provided to drive a tool holder 23A, 23B and therefore a tool 38A, 38B arranged on the tool holder 23A, 23B. The tool 38A is for example a sawing tool, the tool 38B is a grinding pad. The drive motor 22 can drive the tool 238A, 38B directly or via a gear, e.g. a gear 22A for an oscillating movement.

The machine tool 20A, 20B can be switched on and switched off using a switching element 24, for example an on-switch/off-switch. A further switching element 25 is for example designed as a speed regulator or speed controller. An embodiment is possible in the case of which for example the speed of the drive motor 22 is modifiable by a corresponding actuation stroke of the switching element 24.

The hand-held machine tool 20A, 20B has a control device 26 to actuate the drive motor 22. The control device 26 for example comprises a processor 27 and a memory 28. A program module or a plurality of program modules 29 are stored in the storage device 27, whose program code is executable by the processor 27 in order to control the hand-held machine tool 20A, 20B and/or to communicate with the energy storage modules 40A, 40B.

The machine tool 20A, 20B has a suction connection or suction outlet 39 to connect a suction hose 15 via which dust occurring during the operation of the tool 38A, 38B can be suctioned. The suction outlet 39, for example a connection fitting, communicates with suction openings arranged on or in the tool 38B, which are not visible in the drawing. Therefore, dust can be suctioned directly away from the tool 38A, 38B in a normal manner known per se.

A vacuum cleaner 70 of the system 10 has a vacuum housing 71 which can be put and/or is rollable for example on rollers 71A, 71B on a floor. The vacuum device 70 is a mobile vacuum device. The vacuum cleaner 70 could, however, also have the shape of a stackable vacuum cleaner, consequently a stack housing and/or have a box shape. The rollers 71A, 71B are optional.

The vacuum cleaner 70 has on the front side of the vacuum cleaner housing 71 a suction inlet 72 to which the suction hose 15 is connectable. The suction hose 15 extends with a longitudinal end 16, which is connected to the suction outlet 39, and another longitudinal end 17, which is connected to the suction inlet 72, between the machine tool 20A and the vacuum cleaner 70. The machine tool 20B is connected via a branch 18 of the suction hose 15 to the vacuum cleaner 70. The branch 18 branches to the longitudinal end 16 and to a longitudinal end 19 which is connected to the suction outlet 39 of the machine tool 20B. Of course, the branch 18 of the suction hose 15 is optional. A suction hose can also be provided in a manner known per se which extends directly between a suction outlet 39 and the suction inlet 72, without having a branch.

A dirt collection chamber 73 is provided in the vacuum housing 71 in which dust and other particles can be received from a vacuum flow S, which is suctioned via the suction outlet 72. A filter 74 is preferably provided above the dirt collection chamber 73. However, a filter sack can also be arranged in the dirt collection chamber 73 in addition to or instead of the filter 74 which is suitable for collecting dirt and particles. The already mentioned vacuum flow S, which is suctioned through the suction inlet 72, can be generated by a suction unit 75. The suction unit 75 is for example supplied with electric power using a mains connection device 76. The mains connection device 76 for example comprises a connection cable and a connection plug to connect to an electric supply network EV, in particular with 220 V or 110 V alternating current.

The functions of the vacuum cleaner 70 are controllable by an operating element arrangement 77. The operating element arrangement comprises for example a switching element 78, by means of which the vacuum cleaner can be switched on or switched off or switched into automatic operation, in the case of which for example a current guided via an outlet 79 leads to the suction unit 75 switching on and switching off. The outlet 79 is expediently provided on the operating element arrangement 77. An electric consumer, preferably an electric hand-held machine tool 20C can be connected in the outlet 79.

The outlet 79 has contacts 80, in particular bushes into which contacts 32C of a plug 31C of the hand-held machine tool 20C are insertable. The plug 31C is arranged on a connection cable which is a part of a mains connection device 30C. If an operator actuates a switching element 24 of the hand-held machine tool 20C to power its drive motor 22, with which for example a saw blade is drivable, current flows via the mains connection device 30C, which is provided by the vacuum cleaner 70 via the outlet 79. This current is detectable by a current sensor 81 in a manner known per se. A control device 86 of the vacuum cleaner 70 switches on the suction unit 75 in the case of a current flow via the outlet 79 in a manner known per se and at the end of the operation of the hand-held machine tool 20C, i.e. when the current sensor 81 no longer determines a current flow, switches off the suction unit 25, expediently with a stopping time.

The current sensor 82 is for example connected to an input/output interface 82 of the control device 80. The input/output interface 82, for example a power electronics interface further serves to actuate the suction unit 75.

The control device 86 further has a processor 87 and a memory 88 in which one or a plurality of program modules 89 are stored. The at least one program module 89 has a program code which is executable by the processor 87 and, amongst other things, enables one or a plurality of the following functions.

The outlet 79 is connectable via the vacuum cleaner 70 to the supply network EV or also connectable directly to the supply network EV, namely using the mains connection device 30C.

The machine tools 20A, 20C in contrast are equipped for a cableless or wireless operation. They can namely be supplied with electric power using the energy storage modules 40A, 40B.

The energy storage modules 40A, 40B are constructed functionally similarly, with mechanical differences and/or electric differences possibly readily existing with regards to the power supply capacity, voltage or the like.

The energy storage modules 40A, 40B have module housings 41A, 41B in which energy storage devices 42 are arranged. The energy storage devices 42 have one or a plurality of storage cells 43, in particular a storage cell arrangement with a plurality of storage cells 43 which are rechargeable.

Using a display device 44, which is optionally present in the case of the energy storage module 40A, a charge status of the energy storage device 42 can be output, for example acoustically and/or optically. The display device 44 for example comprises a speaker 44A, which can signal a low charge status, e.g. using a warning tone. In the case of the display device 44, an arrangement of one or a plurality of lights 45 is preferred, for example lights 45A, 45B, 45C and 45D. The lights 45A-45D are preferably LEDs.

The functions of the energy storage modules 40A, 40B are controllable by control devices 46.

The control devices 46 can be supplied with electric energy directly by the energy storage device 42 and/or one or a plurality of the storage cells 43. For example, supply lines 42X can be provided between the energy storage device 42 and the control device 46. A control device 46 can also have a supply module 46X to adapt a voltage provided by the energy storage device 42 or a supply current provided by the energy storage device 42. Therefore, a respective control device 46 can be supplied with electric energy locally, irrespective of whether the energy storage module 40 is connected to an electric device, for example a charging device or a machine tool or a vacuum cleaner.

The control devices 46 for example have a processor 47 and a memory 48 in which at least one program module 49 is stored. For example, the control device 46 can communicate with the control device 26 of the hand-held machine tool 20A, 20B. The processor 47 can execute program code of the program modules 49, amongst other things to implement the functions explained in detail below.

The energy storage modules 40A, 40B are detachably connectable to one another with the machine tools 20A, 20B using device interfaces 30 of the machine tools 20A, 20B and device interfaces 50 of the energy storage modules 40A, 40B.

The machine tools 20A, 20B form first system components 11, the energy storage modules 40A, 40B second system components 12, which are fixedly connected to one another such that they in each case form a system.

The device interfaces 30, 50 comprise, to this end, contours fitting together in a positive-locking manner, for example to form positive-locking contours suitable for rotary locking or as in the present case plug positive-locking contours 51 on the device interface 50, which can engage the device interfaces 30 in a positive-locking manner with plug counter positive-locking contours 31, namely in the context of a plug movement.

Using this plug movement, device supply contacts 32 of the device interface 30 enter into contact with supply contacts 52 of the device interface 50 such that electric energy from the energy storage device 42 can be provided via the supply contacts 52, 32 for the respective machine tool 20A, 20B, in particular its drive motor 22.

The device interfaces 30, 50 further comprise data contacts 33, 53 of data interfaces 34, 54 such that even data communication, in the present case in particular a bus communication between the system components 11, 12, is possible.

A fixing device 55 provides additional hold for the positive-locking design using the plug positive-locking contours 51, 31 by means of which the system components 11, 12 are fixable to one another. The fixing device 55 for example comprises a fixing element 56, in particular a catch, a latching element or the like which can be engaged with a fixing contour 35. The fixing contour 35 and the fixing element 56 are arranged on the first system components 11 and the second system components 12, with the reverse configuration also being readily possible. The fixing device 55 forms, in the present case, a locking device and/or catch device. The fixing element 56 can, using an actuation element 57, be disengaged, optionally also engaged, with the fixing contour 35. For example the fixing element 56 is a fixing projection/locking projection, which can be engaged with the fixing contour 35 designed as a fixing holder or depression. If the fixing device 55 engages its fixing position or locking position, the plug positive-locking contours 51 remain engaged with the plug counter positive-locking contours 31, i.e. a relative movement of the system components 11, 12 along the plug axis of the plug positive-locking contours 51, 31 is not possible.

The actuation element 57 and/or the fixing element 56 are spring-loaded by a spring arrangement (not visible) into the fixing position or locking position. Therefore, the fixing device 55 can be moved out of the fixing position into the detached position by simple pressure actuation or button actuation of the actuation element 57. In each case, one fixing element 56 is preferably provided on the energy storage module 40A on sides opposed to one another, also in each case one actuation element 57 is necessary, while in the case of the energy storage module 40B only a single push button or a single actuation element 57 is necessary.

The energy storage modules 40A, 40B can be charged using a charging device 220. The charging device 220 has a charging device housing 221 on which a device interface 230 is provided. The device interface 230 has plug counter positive-locking contours 231 which are compatible in a positive-locking manner with the plug positive-locking contours 51 of the energy storage modules 40A, 40B. Locking is not necessary for stationary operation. Fitting the device interface 50, the charging device 220 further has device supply contacts 232 and data contacts 233 of a data interface 234, preferably a bus interface. A voltage transformer 235 is preferably arranged in the charging device 220, which can be supplied with electric power using a mains connection device 236 and provide a direct voltage at the device supply contacts 232 to charge the energy storage device 42. The connection plug 237 forms a part of a mains connection device 236 and can be arranged directly on the charging device housing 221 or be connected via a line, which is schematically represented, to the charging device housing 221. The connection plug 237 is connectable to the supply network EV.

The data interfaces 34, 54 and 234 are bus interfaces in the present case. For example, the bus interfaces or data interfaces 34, 54, 234 are I²C bus interfaces. The bus interfaces comprise a clock line CL, a data line D and a supply line VD, to which data contacts 33A, 53A and 234A are assigned, a clock line CL, to which data contacts 33B, 53B and 233B are assigned, and a data line D, to which data contacts 33C, 53C, 234C are assigned. The supply line VD is used so that the device interface 30 or 230 of the device interface 50 provides an electric supply voltage, for example a bus voltage UB. A bus clock of the bus BU implemented on the data interfaces 34, 54, 234 is provided via the clock line CL. Data is transferred via the data line D, preferably bidirectionally from the energy storage module 40 to the machine tool 20 and vice versa and/or from the energy storage module 40 to the charging device 220 and vice versa.

If the system components 11, 12 are connected to one another, the energy storage module 40 provides a supply voltage UV to the supply contacts 52A, 52B which is suitable for operating the drive motor 22. The supply voltage UV is for example a direct voltage of 15 volts or 18 volts, but can also be another voltage at any time. It should be mentioned at this point that an energy supply module could of course also provide an alternating voltage. This is not essential. The control device 26 of the machine tool 20A, 20B, simply designated below as the machine tool 20, actuates, as a function of an actuation of the switching element 24, the drive motor 22, with it opening or closing for example a switch 24A. Instead of the switch 24A, a power electronics, for example an energisation device can also be provided for an electronically commuted drive motor 22. Furthermore, it is conceivable for the switching element 24 to be switched directly into the current circuit of the drive motor 22 and therefore to be able to switch it on and off. If the switch 24A is closed, the current flows from the energy storage device 42 via a line L1 to the drive motor 22 and from said drive motor back via a line L2 to the energy storage device 42.

Figure 12:
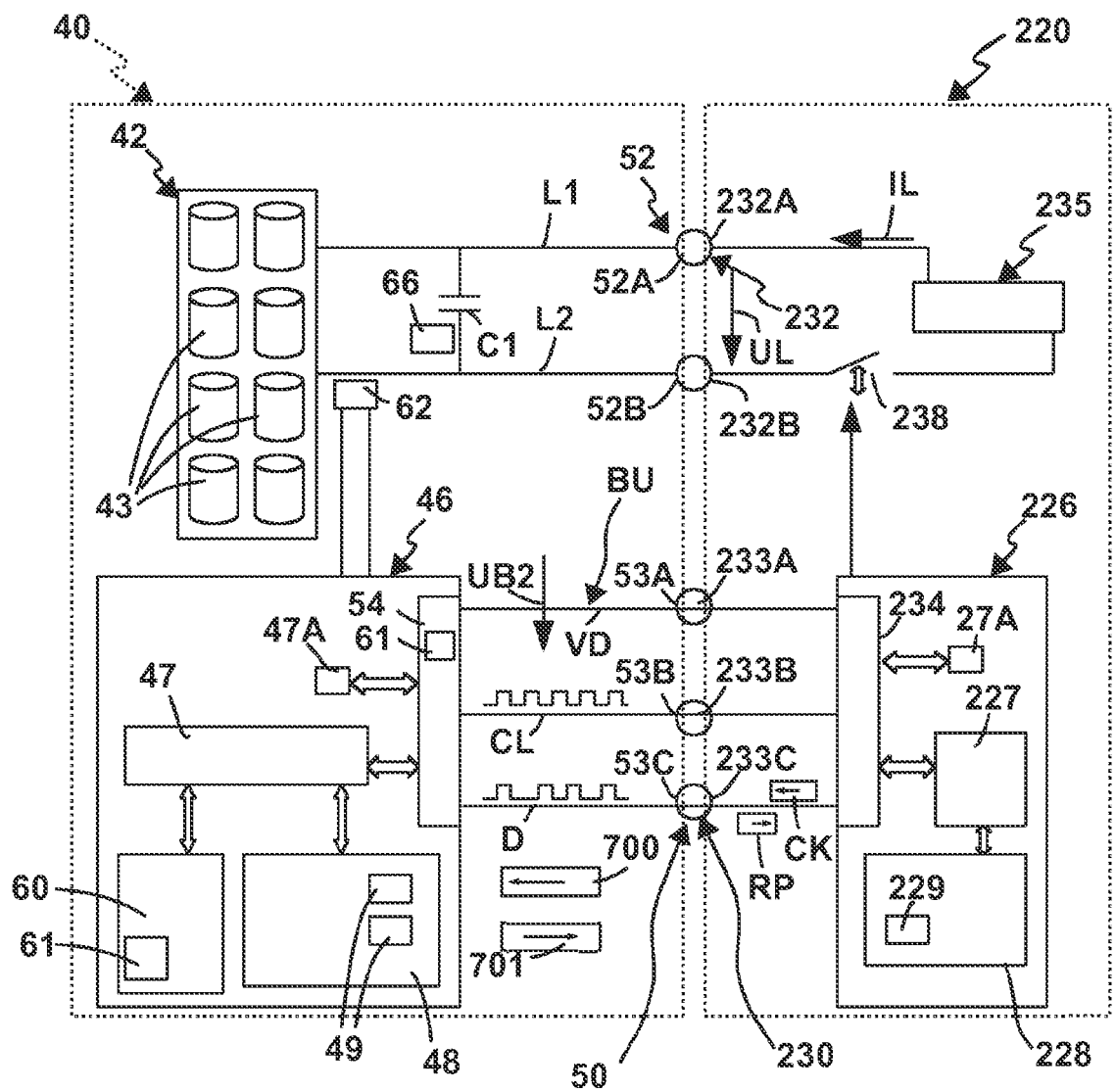

In the case of a charging operation, this current flow design is precisely the reverse, which is clear from FIG. 12. A charging current IL flows in this case from the voltage transformer 235 via the line L1 to the energy storage device 42. The supply contact 232B is, just like the supply contact 52, assigned to a line L2, for example to an earth line. The charging operation is preferably controlled by a control device 226 of the charging device 220. The control device 226 can for example actuate the switch 238 in order to begin or end the charging operation. In order to monitor the charging operation, the charging device 220 also communicates with the energy storage module 40, namely via the data interface 234 and the data contacts 233A, 233B and 233C assigned thereto for the supply line VD, the clock line CL and the data line D. The charge status of the energy storage device 42, its nominal voltage or the like can for example be requested by corresponding communication on the bus BU between the charging device 220 and the energy storage module 40. In order to control and monitor the charging operation, the charging device 234 has for example a processor 27 which can execute control commands or program code of a program module 229 to control the charging operation. The processor 227 is connected to a memory 228 of the control device 226 of the charging device 220 in which the program module 229 is stored.

The vacuum cleaner 70 is actuatable in a wireless or cableless manner. To this end, the vacuum cleaner 70 has an integral external communication apparatus 100 or an external communication apparatus 100 preferably designed as a module. The external communication apparatus 100 is detachably arrangeable in a module holder 90 of the vacuum cleaner housing 71. The module holder 90 is for example arranged in the region of the operating element arrangement 77, in particular a front wall 95 on which the operating element arrangement 77 is provided. When the communication module in the shape of the external communication apparatus 100 is inserted into the module holder 90, contacts of contact arrangements 90, 101 of the module holder 90 and the communication apparatus 100 enter into contact with one another. Therefore, data, information, electric supply voltage and the like can be transmitted. For example, the control device 86 supplies the external communication apparatus 100 with the electric supply voltage via the contact arrangement.

Furthermore, a data interface 83 of the control device 86 and a data interface 108 of the external communication apparatus 100 are in contact with one another using the contact arrangements 101 and 91. The data interfaces 83, 108 for example comprise a bus interface, via which the external communication apparatus 100 and the control device 86 can communicate data and information.

The data interfaces 108, 83 for example implement a bus connection, in particular an I²C bus connection. Other bus communications are also possible. Furthermore, the data interfaces 83, 108 can also comprise individual data contacts, for example for a parallel data transmission.

The module holder 90 comprises side walls 92 which extend from a bottom 93 of the module holder 90 to the front wall 50. In the module holder 90, i.e. in the internal space between the side walls 92 and the bottom 93, the contact arrangement 101 protruding from a rear side 103 of a front wall 105 of the external communication apparatus 100 can engage into the contact arrangement 91 arranged on the bottom 93 of the module holder 90 or enter into contact therewith. Side wall surfaces 102 of the front wall 105 are then aligned with the side walls 92 such that a forward side or the front wall 105 of the external communication apparatus 100, as represented in FIG. 1, is aligned with the front wall 95. The plug connection of the module of the external communication apparatus 100 in the module holder 90 alone ensures a reliable hold. A fixing device for example a catch device, clamp device or the like not represented in the drawing is preferably provided for further fixing. In the present case, a screw connection is provided. For example, one or two screw holders 94 are provided on the module holder 90 which align with screw holders 104 of the external communication apparatus 100 when this is received in the module holder 90. Screws indicated in FIG. 1 can be screwed into the screw holders 104, 94.

The vacuum cleaner 70 can be actuated in a wireless and/or cableless manner using the external communication apparatus 100, for example by a wireless communication interface 60 of the energy storage module 40A or 40B.

It should be mentioned at this point that the wireless communication interface 60 is to be provided by way of example for a wireless actuation of the systems comprising the system components 11 and 12, namely in each case an energy storage module and a machine tool. Thus, the machine tool 20C can for example be equipped with a wireless communication interface 60C in order to directly perform one or a plurality of communication functions still to be described below, i.e. without a respective energy storage module 40, which a wireless communication interface, communicating wirelessly with the vacuum cleaner 70.

The external communication apparatus 100 can be switched, using a registration operating element 106, into a standby mode from an operating mode in which a control connection with the external communication apparatus 100 can be newly established or re-established.

The standby mode or the operating mode are optically and/or acoustically signalled by the external communication apparatus 100. For example, a display device 114 is provided which can signal different operating modes of the external communication device 100. The display device 114 for example comprises a light display, in particular a circular light display. The display device 114 is for example arranged around or on the registration operating element 106. The registration operating element 106 is for example a button 107 around which the display device 114 preferably circularly extends.

When the display device 114 permanently illuminates, it signals an established control connection, i.e. the status "connected". When the external communication apparatus 100 is switched, using the registration operating element 106, from the operating mode into the standby mode, the display device 114 illuminates for example in another colour or with another movement pattern, in particular with a slow, circulating movement pattern. This movement pattern or the colour of the display device 114 can be independent on the type of control connection. When a control connection, as explained below, is a control connection to be currently established and/or a temporary control connection already established, the display device 114 can for example have a slow circulating light display. When, however, a control connection is permanently established or to be established, i.e. the standby mode is suitable for establishing a permanent control connection, the display device 114 illuminates differently. For example, the circular illumination of the display device 114 then takes place at a higher frequency.

For a permanent control connection, a e.g. communication module 300 is provided, which preferably forms a system component of the vacuum cleaner 70, is connected to the external communication apparatus 100.

The communication module 300 is a communication module arranged or arrangeable outside of the vacuum housing 71. The communication module 100 serves to maintain and/or establish a control connection of the electric device in the shape of the system components 11 and/or 12 with the vacuum cleaner 70, in particular the external communication apparatus 100.

The communication module 300 has a module housing 301 which can be placed on the suction hose 15. The module housing 301 expediently has on its upper side 302 a switching element 334 with which the suction unit 75 can be switched on and/or off. The switching element 334 takes up the majority of the upper side 302 in an ergonomically favourable manner such that it is easy to operate or actuate. The switching element 334 is for example a push button, rocker switch or the like.

The module housing 301 has a shape adapted to the suction hose 15. For example, an underside wall 306, which, in the status of the communication module 300 installed on the suction hose 15, comes to rest on its outer circumference, has a round contour adapted to the round outer circumference of the suction hose 15. A forward side wall 303, a rear side wall 304 and longitudinal side walls 305 extend between the underside wall 306 and the upper side or upper side wall 302. They delimit an internal space in which a control device 336 of the communication module 300 is arranged in a supported manner.

The control device 336 for example has a processor 337, a memory 338 and at least one program module 339 which comprises program code which can be executed by the processor 337 to perform the functions of the communication module 330, which will be explained later.

In order to install the communication module 300 on the suction hose 15, hooks 301 are provided on the longitudinal side walls 305. Consequently, the module housing 301 thus has in each case one hook 307 at sides opposed to one another. Each hook 307 has a hook projection 308 and a hook depression 309. The hooks 307 serve to fasten a hose bracket 320 (FIG. 8) for example of a clamping point 321. The hose bracket 320 has on its longitudinal end regions 322 in each case hook holders 323 which can be engaged with the hooks 307. Of course, other fastening technologies are also possible, for example by means of an adhesive strip or the like. Integration of a communication module 300 on the longitudinal ends 16 and/or 17 of the suction hose 15 may also be conceivable, for example when corresponding tubular bodies are provided, e.g. connection pieces or connection fittings made from rubber, plastic or the like. The communication module 300 can, however, also be adhered, welded on the suction hose 15 or similarly otherwise connected to the suction hose 15. However, this is irrelevant for the communication functions of the communication module 300. The ergonomically favourable arrangement on the suction hose 15 is also advantageous.

To switch the external communication apparatus 100 from the operating mode to the standby mode, a registration operating element 316 is provided. The registration operating element 316 for example comprises a button 317. The functions of the registration operating element 316 correspond to those of the registration operating element 106 such that the operator so to speak finds the same operating design.

Accordingly, a display device 314 is also designed identically or similar to the display device 114. The display device 314 for example comprises a light display which signals information in relation to the establishment and/or presence of a control connection between the communication module 300 and the external communication apparatus 100.

When an operator for example actuates the registration operating element 316, in particular pushes the button 317, a communication interface 311, in particular a Bluetooth interface, a WLAN interface or the like sends a corresponding control signal, in particular a switching message SN to the communication interface 110 to switch to the standby mode. As a result, the external communication apparatus 110 is switched to a standby mode which the display device 314 signals. An actuation of the registration operating element 316 leads to the external communication apparatus 100 switching from the operating mode to the standby mode. In order to send the control signal, an encrypted and/or authenticated connection is preferably provided between the communication module 300 and the external communication interface 110.

When the switching element 334 is actuated, the communication module 300 sends a start command or switch-on command for the suction unit 75 to the external communication apparatus 100 and consequently to the control device 86 of the vacuum cleaner 70. Using a switching element 335, for example a rotary element, a sliding element or the like, the communication module 300 can send a control command to the external communication device 100 and therefore to the vacuum cleaner 70, with which for example the speed of the suction unit 75 and/or its power can be adjusted. Consequently, the communication module 300 can serve as a remote control for the suction unit 75. A secured and/or encrypted control connection between the communication module 300 and the external communication apparatus 100 is also advantageous for the remote control functions.

Since the communication module 300 forms a system component of the vacuum cleaner 70, a control connection from the communication module 300 to the external communication apparatus 100 is a so to speak permanent control connection. Such a control connection requires a higher degree of difficulty to establish it than a control connection between a system component 11 or 12 and the vacuum cleaner 70. Accordingly, for example the registration operating element 106 and/or 316 must be actuated for longer in order to authorise or register the communication module 300 at the vacuum cleaner 70 or the external communication apparatus 100. A registration procedure to establish a control connection between one of the system components 11 or 12 for example the energy storage module 40 and the external communication apparatus 100 is, in contrast, easier to establish, for example using a shorter actuation of the registration operating element 106 and/or 316.

The machine tools 20A, 20B communicate using the energy storage modules 40A, 40B with the vacuum cleaner 70 and can actuate it via control connections S1 and S2. However, control commands cannot be sent directly via the control connections S1, S2, but rather only after a previous registration/authorisation of the machine tools 20A, 20B at the external communication apparatus 100. Consequently, the respective control connection S1, S2 must firstly be established before it is available for the transmission of control commands and/or status signals between the components 20A, 70 or 20B, 70 remote from one another.

The configuration is in this case made such that the machine tools 20A, 20B do not communicate directly wirelessly with the vacuum cleaner 70, but rather using the energy storage modules 40A, 40B assigned to them and attached to them. However, it is certainly possible that the communication described below in relation to the wireless communication interface 60 is also implementable with a at the machine tool 20B, namely for example directly (not represented), similar to the control connection S2 or indirectly via the communication modules 300B and 300C, as will be clearer.

Essentially, the energy storage modules 40A, 40B form so to speak gateways for the machine tools 20A, 20B for wireless communication, in particular in the control direction, i.e. from the machine tool 20A, 20B to the vacuum cleaner 70. However, the reverse communication direction from the vacuum cleaner 70 to the machine tools 20A, 20B is also possible via the gateways 40A, 40B.

In order that these functions are particularly easy to implement, the energy storage modules 20A, 20B are smart such that they can identify for example whether they are connected to a device requiring wireless communication with the vacuum cleaner 70 or a device even implementing such communication or to another device, for example a machine tool, which is not suitable for the vacuum cleaner operation, for example a screwing device, a gluer or the like. In particular, the energy storage modules 40A, 40B can detect whether they are connected to the charging device 220.

The charging device 220 sends, namely for example via the bus interface BU, a request message 700 to the control device 46 with which it requests the current charge status of the energy storage device 42, the status and/or the maximum charge voltage for the storage cells 43, maximum charging currents or the like. The control device 46 responds with a response message 701 in which the corresponding information is stored. Using the quality of the request message 700, namely for example the fact that a level of a maximum permitted charging current is requested, the energy storage module 40 identifies that it is connected to a charging device and not to an electric consumer in the manner of the machine tool 20A or 20B which requires a wireless communication connection to a vacuum cleaner.

However, other information can also be evaluated by the energy storage module 40 to recognise the connection to a charging device in the manner of the charging device 220. Thus, a charging voltage UL, which is provided by the charging device 220, is higher than a supply voltage UV, which is applied at the connection of an electric consumer between the lines L1 and L2 or the supply contacts 52A, 52B.

The control device 46 is supplied with electric energy via the bus interface or data interface 54. The supply voltage UB2 applied at the supply line VD or the data contact 53A, which is provided by the charging device 220, differs in its voltage level from the supply voltage UB1, which the electric hand-held machine tool 220 provides at the data contact 53A. The supply voltage UB1 is for example 3 volts, the supply voltage UB2 5 volts.

For example, a voltage measuring device 61, in particular a voltage sensor, resistance circuitry or the like is provided at the data interface 54 to detect the different voltage levels of the voltages UB1 and UB2 such that the control device 46 can identify whether it is connected to a charging device (charging device 220) or to an electric consumer or an electric machine tool in the manner of the machine tools 20A, 20B.

It is possible that the control device 46, depending on whether the energy storage module 40 is connected to a machine tool 20 or to the charging device 220, changes an operating mode of the wireless communication interface 60. For example, the control device 46 activates the wireless communication interface 60 when the energy storage module 40 is connected to a machine tool 20, while it deactivates the wireless communication interface 60 when the energy storage module 40 is connected to the charging device 220.

It is also possible that the control device 46 does not deactivate the wireless communication interface 60, when the energy storage module 40 is connected to a machine tool 220, but changes the communication mode. Thus, the wireless communication interface 60 can for example remain active for communication with the configuration device 500 still to be explained, in particular a smartphone when the energy storage module 40 is not connected to the machine tool 20, for example is connected to the charging device 220 or has no such connection. Using the configuration device 500, for example the smartphone, program data or the like can for example be transmitted to the energy storage module 40, even if this is not connected to the machine tool 20.

However, when the energy storage module 40A or 40B is connected to the machine tool 20A or 20B, the wireless communication with the vacuum cleaner 70, in particular its external communication apparatus 100 is easily possible without problems.

A function and communication process 400 begins for example with an operating action 401 of an operator N. The operator N of the system 10 connects for example the vacuum cleaner 70 to the supply network EV or actuates the switch or the switching element 78 such that the vacuum cleaner is essentially operationally ready, i.e. has a function 410 "status in operation".

A control device 117 of the external communication apparatus 100 switches at this point into a status 411 in which the external communication apparatus searches for devices already authorised to actuate the vacuum cleaner 70. This status 411 lasts for example a predetermined time, in particular one minute or two minutes, after which it ends once again. This time limitation is an option that reduces the risk of unauthorised access to the vacuum cleaner 70.

In order to perform this functionality and the following functionalities, the control device 116 has for example a processor 117 to execute the program code of a program module 119 which is stored in a memory 118 of the external communication apparatus 100.

A function 412 of the program module 119 enables for example the detection of information of the registration operating element 106. Thus, if the operator for example in a step 413 actuates, in particular presses the registration operating element 106, the registration operating element reports the function 412 using an output command 414 to the operator N by it namely actuating the display device 114 such that the operator sees that the external communication apparatus 100 and therefore the vacuum cleaner 70 is ready to establish new control connections. The external communication apparatus 100 goes into a status 415, namely into an operation standby mode in which a control connection can be established with the external configuration apparatus 100.

The communication module 40 is thus inactive at the start of the function and communication process 400 in a status 430 "sleep". Proceeding therefrom, a number of scenarios are possible to establish one of the control connections S1 or S2, of which a first scenario is described below:

The operator N actuates for example the switching element 24 of the machine tool 20A in order to switch it on. The machine tool 20A or the assigned energy storage module 40A is still, however, not authorised to output switching commands or control commands to switch on the suction unit 75. Such a registration or authorisation, however, occurs automatically so to speak when the operator N simply actuates the switching element 24.

If the operator N actuates the switching element 24, the communication relation between the machine tool 20A and the energy storage module 40A is actively switched and/or established. The energy storage module 40, thus each of the energy storage modules 40A, 40B identifies from operational information coming from the actuation of the switching element 24 that a device suitable for establishing and using a control connection is connected to the device interface 50.

The energy storage module 40 can thus for example identify using the supply voltage UV that an electric consumer is connected. The voltage UV differs from the voltage UL of the charging device 220.

Further operational information can for example also be the supply voltage UB1 which is provided by the control device 26 to the supply line VD or the data contact 53*a*. The supply voltage UB1 differs from the supply voltage UB2 of the charging device 220, it is in particular lower than it. Therefore, the supply voltage UB1 thus also forms an indicator of an actuation of the switching element 24.

Furthermore, an initialisation communication can be evaluated on the bus BU from the control device 46 as an indicator of the activation of the data interface 54 by a device actuating the vacuum cleaner 70, i.e. the machine tool 20A or 20B (designated below only as machine tool 20). Thus, for example a request message 750 can be sent from the control device 26 to the control device 46, with which for example a supply voltage UV of the energy storage module 40, which can be provided, is queried. In the request message 750, however, data identifying the electric device or the machine tool 20 may be contained, for example an identifier 751 which characterises the machine tool 20A, 20B as a machine tool requiring dust extraction. The request message 750 for example represents operationally ready information of the machine tool 20. With a response message 752, the control device 46 responds to the request message 750 and provides the requested information and/or information, for example charge status of the energy storage module etc.

Coming from the actuation of the switching element 24, the energy storage module 40 sends via the wireless communication interface 60 in a function 431, for example the program module 419, in the context of a transmission operation 432, a registration message 440 to the external communication apparatus 100.

The registration message 440 comprises for example a broadcast transmission identifier 44*x*, i.e. a registration message, which is directed to a plurality of essentially ready-to-receive vacuum cleaners, not only the vacuum cleaner 70. Furthermore, an authorisation parameter 442 is optionally indicated in the registration message 440. The authorisation parameter 442 comprises for example an essential system compatibility of the energy storage module 40 or the machine tool 20 with the vacuum cleaner 70. The authorisation parameter 442 can for example comprise a manufacturer identifier or the like.

The external communication apparatus 100 receives the registration message 440 with a function 416. The function 416 is active for a predetermined time period, for example 500 msec to 1000 msec because in this time the registration procedure must be concluded with the registering energy storage module 40. With a registration confirmation message 445, the external communication apparatus 100 confirms the registration of the energy storage module 40. The registration confirmation message 445 is sent in a step or transmission operation 417. The registration confirmation message 445 comprises for example the address identifier 446 of the energy storage module 40 as the sender address. Optionally, further information 447 can be contained in the registration confirmation message 445, for example an access key, a password or the like. The information 447 can, however, also for example identify a suction power of the suction unit 75 that is required or to be set or other similar information favourable to the subsequent operation.

The registration of the energy storage module 40 at the external communication apparatus 100 is, however, only a temporary registration which is necessary for a current operation. Accordingly, a temporary identifier 443 is advantageously contained in the registration message 440 such that the external communication apparatus 100 knows so to speak that only a temporary registration or temporary control connection is desired.

At this point, a difference with the so to speak permanent registration for example of the communication module 300 is also clear. In order to register the communication module 300, a longer or more difficult operating action of the operator N is necessary, namely for example a longer actuation of the registration operating element 106 than in the case of a temporary registration. In the case of a standby mode for a permanent control connection or communication relation, the external communication apparatus 100 in the case of the output command 414 gives a signal different with respect to the registration for a temporary control connection to output to the display device 114, for example for more rapid flashing of the LEDs or flashing of the LEDs at shorter frequency. Lastly, the communication module 300 does not indicate in a registration message comparable with the registration message 440 the temporary identifier 443, but rather a permanent identifier.

When the wireless communication interface 60 or the energy storage device 40 is successfully registered at the vacuum cleaner 70 or the external communication apparatus 100, both components go into a status 418 "connected". The permanently registered communication module 300 would also adopt this status. It should be added that the function 431 advantageously comprises a time limitation. If a registration confirmation message 445 does not arrive within a predetermined or settable time, for example 500 to 1000 msec after switching on the switching element 24 and/or after sending the registration message 440, the registration attempt fails so to speak.

Proceeding from the status 418 "connected", an authentication procedure and/or an encryption procedure is advantageously provided. The subsequently established control connection S1 or S2 should namely advantageously take place in an authenticated and/or encrypted manner.

For example, the external communication apparatus 100 transmits with an encryption parameter 451. When namely a previous encryption or previous communication has already existed between the external communication apparatus 100 and one of the energy storage modules 40A, 40B, the external communication apparatus 100 uses the already existing parameters. For example, the address identifier 446 and assigned thereto the encryption parameter 451 of an already previously existing control connection to the energy storage module 40A, 40B are stored in the memory 118 of the external communication apparatus.

For example, it is mentioned that other address identifiers and assigned encryption parameters can also be stored in the memory 118, for example an address identifier 446C of the wireless communication interface 60C and an encryption parameter 451C for a control connection between the wireless communication interface 60C of the machine tool 20B and the external communication apparatus 100.

It should be mentioned at this point that the external communication apparatus 100, when encryption parameters for the respective energy storage module 40 are not known, sends, using a message 455, the encryption parameter 451 or a new, different encryption parameter 456 such that an encrypted communication between the components 100, 40 is possible and therefore the status 421 "encrypted connection" is achieved.

Optionally, the external communication apparatus 100, in particular its control device 116, controls the display device 114 (step 423A) such that it signals the available, encrypted connection. For example, the display device 114 then permanently illuminates.

It is also possible that a plurality of address identifiers and/or encryption parameters is stored at an energy storage module. Thus, for example in the case of the energy storage module 40 or the control apparatus 46, provision can be made for it to have stored address data and encryption data of a further vacuum cleaner not represented in the drawing, namely for example an address identifier 441B and an encryption parameter 451B of this further vacuum cleaner.

Therefore, the energy storage module 40 can also, if required, so to speak access other vacuum cleaners directly.

Coming back to the function/communication process 400, the further communication takes place for example as follows:

In a function 433 "switch on", the energy storage module 40 sends in a transmission operation 434 for example the control device 46 for example a control command 460 which contains a switch-on identifier 461. In addition, the control device 46 activates in an activation step 435 the display device 44 to display the established control connection S1 or S2. For example, the lights 445 illuminate blue or in a pattern different to the display of a charge status.

After receiving the control command 460, the external communication apparatus 100 for example actuates the control device 86 such that it switches on the suction unit 75 in a step 422. In addition, the external communication apparatus 100, in particular its control device 116, controls the display device 114 (step 423) such that it signals the switching-on of the suction unit 75. For example, the display device 114 then permanently illuminates.

When the operator N releases the switching element 24, the current flow via the drive motor 22 for example ends. The control device 46 can detect this, for example using a corresponding current sensor 62. The supply voltage or bus voltage UB1 is in this case also lower or smaller. Furthermore, it is possible that the energy storage module 40 actively sends the data interfaces or bus interfaces 34, 54 a message 753 "motor switched off". One or a plurality of these trigger events, which are triggered by the operating step 403 of the operator N, lead to a function 436 "switch off" of the energy storage module 40. This then sends in a transmission operation 437 a control command 462 to switch off the suction unit 75, preferably after a predetermined stopping time for the suction unit 75, with the message or the control command 462 containing a switch-off identifier 463. In the switch-off identifier 463, for example a stopping time for the vacuum cleaner 70 or the suction unit 75 is indicated.

The request message 750 and the message 753 form received information EM, which the energy storage module 40 receives at the data interface 54, in order to output namely for example the registration message 440 to the wireless communication interface 60 as a function of transmission signals SII.

The response message 445 is for example a received signal ESI, using which the energy storage module 40 outputs the response message 752 to the data interface 54 as transmission information SM.

In a function 427 "switch off", the communication apparatus 100 actuates, directly or actuating the control device 86, the suction unit 75 to switch off and the display device 114 to display the ended actuation. For example, the function 427 gives an actuation command 425 to the suction unit 75 directly or via the control device 86, namely the data interfaces 83 and 108.

When the switching element 24 of the machine tool 20 is actuated again, the energy storage module 40 can send further subsequent control commands 460 and 462 in order to switch on and switch off the suction unit 75. Advantageously, provision is made for the respective control connection between energy storage module and external communication apparatus 100 to end after a predetermined time so that for example the external communication apparatus goes into a status 428 (corresponding to the status 411) and searches for devices authorised to establish a control connection. The energy storage module 40 in contrast goes into a status 439, namely a status "sleep", corresponding to the status 430. When the control connection from the energy storage module 40 to the external communication apparatus 100 or the vacuum cleaner 70 has ended, the function 436 expediently outputs this new operating status to the display device 44, for example by the display device 44 being actuated using an actuation in a deactivation step 438 to signal the ended control connection. The lights 45 then for example no longer illuminate blue, but rather green and signal the charge status of the energy storage device 42.

Furthermore, it is possible that the machine tool 20 sends a configuration message 754 via the bus BU to the energy storage module 40. In the configuration message, for example configuration data 755 is indicated to set the vacuum cleaner 70, for example a required suction power of the suction unit 75, a typical particle amount in the dust generated by the machine tool 20 etc. The energy storage module 40 preferably provides this data via the wireless communication interface 60 to the external communication apparatus 100 to configure the vacuum cleaner 70, for example as configuration message 465. The external communication apparatus 100 provides the configuration data 755 to the control device 86 to further process, in particular suitably actuate the suction unit 75, e.g. using a transmission operation 437'.

It is preferred for the control device 86 and/or the external communication apparatus 100 to permanently store the configuration data 755 and assign it to the respective machine tool 20A and 20B, for example in the memory 88 and/or 118.

Furthermore, it is advantageous for an operator to be able to override the stored configuration so to speak, for example by an actuation of the operating element arrangement 77. Thus, for example a suction power of the suction unit 75 can be set at a switching element 78A.

It is possible that suction parameters set directly by an operator at the vacuum cleaner, in particular suction parameters set at the switching element 78A or other operating elements of the operating element arrangement 77, are permanently stored by the control device 86 and/or the external communication apparatus 100 and assigned to the respective machine tool 20A and 20B, for example in the memory 88 and/or 118 when the vacuum cleaner is currently actuated by the respective machine tool, for example one of the machine tools 20A or 20B. In this scenario, it is possible, however not absolutely necessary, for the configuration data 755 or suction parameters to be sent wirelessly by the machine tool 20A or 20B.

Establishing a control connection can, however, also take place automatically so to speak when an energy storage module 40 and a machine tool 20 are connected together. This is explained below by way of example of one of the energy storage modules 40. However, it is also possible that for example the wireless communication interface 60C in this manner so to speak automatically establishes a respective control connection to the vacuum cleaner 70 or the external communication apparatus 100 when the energy supply is so to speak started by the energy storage module 40 or is arranged on the device interface 30.

Thus, for example the energy storage module 40 and/or the machine tool 20 can have capacity sensors 66, 36 with which capacities C1 and C2 between the supply contacts 32A, 32B or 52A, 52B can be measured. The capacitive relationships change namely between the lines L1 and L2 thus at the energy-supplying contacts or the energy-supplying lines when a respective energy storage module 40 is fastened to a machine tool 20. The sensors 36, 66 are connected with the control devices 26, 46 or communicate therewith. Thus, for example the control device 46, when the sensor 66 identifies that the machine tool 20 is connected, i.e. an operating status is achieved, can automatically send the registration message 440.

In order to identify a separation status and/or an operating status between an energy storage module 40 and a machine tool 20 and/or a vacuum cleaner, at least one verification message in particular provided exclusively to verify the operating status or separation status can be provided to a data interface, for example the bus interface BU. For example, a type of ping message can be provided for this purpose. The processor 27 and/or a processor 27A of the machine tool 20 or of the charging device 220 provided especially for the mentioned purpose can in particular cyclically send a verification message CK, using which the energy storage module 40 identifies for example that it is connected to the machine tool 20 or the charging device 220 or that there is no connection to such a device. It is possible that in order to receive the verification message CK the processor 47 or a processor 47A provided especially for this message is present at the energy storage module 40. The processor 47 and/or 47A can send as the response to the verification message CK for example a response message RP.

In another manner, it can also be sensorily detected whether an energy storage module 40 and a machine tool 20 are in a separation status or another operating status connected to one another, when namely the device interfaces 30, 50 are connected to one another.

Thus, for example a sensor 58 can sense an actuation of the actuation element 57 of the fixing device 55. When an operator pushes the actuation element 57, consequently thus wishes to trigger the fixing of the fixing device 55, this will be assessed as a transition from the operating status to the separation status. The energy storage module 40, in particular the wireless communication interface 60 can in this case for example automatically end the control connection S1 or S2. To end this, the wireless communication interface 60 for example sends a corresponding separation command or a separation message. It is particularly preferred when, through actuation of the actuation element 57, also the vacuum cleaner 70 can also be switched off because the components 20 and 40 are separated from one another. For example, the control device 46 sends the control command 462 when the actuation element 57 is actuated, which can be detected by the sensor 58.

However, it is also possible that for example one or a plurality of motion sensors are provided, namely for example a motion sensor 59 at the energy storage module 40 and a motion sensor 59B at the machine tool 20. When the motion sensors 59, 59B signal the same movements, the control devices 46, 26 can communicate this to one another and as a result identify that the energy storage device 40 and the machine tool 20 are in the operating status, i.e. in the status fastened to one another.

Furthermore, it is possible that for example an optical sensor 68 or another proximity sensor detects when the device interface 30 is fastened to the device interface 50. The optical sensor or proximity sensor 68 is for example marked on the energy storage module 40A according to FIG. 5, but could readily also be provided on the device interface 30 of the machine tool 20 (see FIG. 4).

Like the proximity sensors or optical sensors 68 (ultrasonic sensors, magnetic sensors or the like can also for example be provided), an electric switch 68, in particular a push button or press button is also actuated when the plug positive-locking contours 51 and 31 are engaged with one another, i.e. when the device interfaces 30, 50 are mechanically connected to one another. The electric switch 69 can also therefore distinguish the operating status from the separation status of the device interfaces 30, 50 and lead to the wireless communication interface 60C or the energy storage module 40 sending the registration message 440.

It is also possible that the energy storage module 40 receives in the context of the received information EM at least one status information item, in particular error information and/or switching position of a switch, of the electric device and/or at least one identification information item, for example a serial number of the electric device. Thus, for example the energy storage module 40 can receive error information as status information 29C and identification information 29D for example a unique identifier or a serial number of the machine tool 20, from the machine tool 20. In this case, it is possible that the machine tool 20 sends this received information EM spontaneously via the data interface 54, i.e. without previous request by the energy storage module 40 at the machine tool 20 or that the energy storage module 40 requests this received information EM at the machine tool 20. The error information can for example represent overheating or electric overloading of the machine tool 20. The identification information 29D can also comprise a type identifier, so that for example the type of machine tool 20, in particular screwing device, sawing machine or the like can be identified using the identification information 29D.

The aforementioned received information EM is for example not security-related or to be kept secret. In particular, it is advantageous for the energy storage module 40 to send, in particular encrypted, this received information EM in the context of a broadcast communication or advertising communication cyclically or periodically and/or at the transition from the separation status to the operating status, i.e. in the case of connection to the machine tool 20. Of course, encrypted communication can also take place when for example encryption parameters are already exchanged between the energy storage module 40 and the configuration apparatus 500 or another receiving device. In all aforementioned scenarios, for example the configuration apparatus 500 can receive the identification information 29D and/or the status information 29C from the energy storage module 40.

The vacuum cleaner 70 can, as explained, have one or a plurality of communication modules 300. The arrangement with a plurality of configuration modules 300A, 300B and 300C is optional, i.e. only one of these communication modules could for example be provided or even none of them. The vacuum cleaner 70 would still function.

The communication modules 300A can be used using their communication interfaces 311 to maintain or establish a control connection. Thus, for example a control connection S6 can be established by the hand-held machine tool 20B or the energy storage module 40B to the vacuum cleaner 70 or the external communication apparatus 100, which is established and/or maintained at least partially by the communication module 300B and 300C.

Thus, for example the wireless communication interface 60C of the machine tool 20A or the wireless communication interface 60 of the energy storage module 40B can communicate on a section S61 firstly with the communication module 300, for example in order to send the control command 460 and/or 462, i.e. to switch on and switch off the suction unit 75. On a communication section or connection section S6.2, the communication module 300 communicates this information or this control command to the communication module 300B which in turn provides the received control command or the received information on a connection section S63 to the external communication apparatus 100 or the vacuum cleaner 70. Since the communication modules 300B and 300C are arranged only at a short distance to the system components 20B/40B, on the one hand, and, on the other hand, to the vacuum cleaner 70 or the communication device 100, the connection sections S61 and S63 are short. Accordingly, the transmission power of the external communication apparatus 100 and of the wireless communication interface 60/60C can be particularly low.

In particular on a short transmission path between the respective communication module 300B and the wireless communication interface 60, 60C or the communication module 300C and the external communication device 100 not only is the transmission power particularly low, but the security aspect is also particularly favourable. For example, the receiving ranges of the communication modules 300B and 300C can be designed short such that interrupting information of a third party or an interrupting control command is not even received and provided by the communication modules 300B and 330C.

Of course, the communication modules 300B and 300C can also provide information sent by the vacuum cleaner 70 to the energy storage module 40B or the machine tool 20B, i.e. they can operate unidirectionally either from the vacuum cleaner to the machine tool or vice versa from the machine tool to the vacuum cleaner or even bidirectionally. The gateway function is expediently bidirectional. Thus, the vacuum cleaner 70 can for example communicate via the control connection S6, which is in this case a reporting connection, for example a fill level of the dirt collection chamber 73 such that the machine tool 20B possibly adjusts its operation when dust discharge is no longer possible.

The communication modules 300A and 300B can also readily in this manner implement a gateway function in relation to the machine tool 22A and the vacuum cleaner 70.

It is not absolutely necessary that, in order to implement the gateway function, two communication modules are provided, of which one is arranged closer to the vacuum cleaner and the other closer to the machine tool or its energy storage module. For example, it is possible that a communication module 300, for example the communication module 300A serves as a gateway between the external communication apparatus 100 and the energy storage module 40A.

The communication modules can also assist with establishing communication relations and in particular control connections. Furthermore, a communication module 300 can also be authorised in the following manner for the controlling or communicating wireless connection with the external communication apparatus 100.

For example, the external communication apparatus 100 has a communication interface 109 according to a second standard, which differs from the communication interface 110. For example, the first standard of the communication interface 110 is a Bluetooth WLAN or the similar other standard, while the second standard of the communication interface 109 is configured for near-field communication, for example is an RFID communication interface or a NFC communication interface.

Further components of the system 10 also expediently have further communication interfaces of this second standard. Thus, for example in the case of the communication module 300, such a communication interface 318 is present.

The energy storage module 40 can also have such a communication interface of the second standard, namely a communication interface 67. Lastly, the communication interface of the second standard can also be provided directly on or in the vacuum housing 71, in particular as a communication interface 84.

The communication interfaces of the second standard, for example of the near-field communication standard serve to store and/or transmit communication parameters which are required for the control connections or reporting connection S1, S2. Control connections S3 and S4 of the communication modules 300A and 300B, with which they actuate the vacuum cleaner 70, for example switch on and switch off the suction unit 75, can in this manner so to speak be authorised or parameterised. Lastly, the gateway function, i.e. the control connection S6 can be set using the communication interfaces of the second standard.

Some variants are preset as follows:

For example, in the case of the communication interface 84 and/or communication interface 109, the address identifier 441 of the vacuum cleaner 70 and the encryption parameter 451 are stored as communication parameters 85, which are required to establish a control connection with the vacuum cleaner 70 or the external communication apparatus 100. When one of the communication modules 300A, 300B or 300C enters with its communication interface 318 in the transmission range of the communication interface 109 and/or the communication interface 84, it can read the communication parameters 85. The reverse approach is also possible that for example the communication parameters of the communication module 300 are stored therein and can be read by one or both of the communication interfaces 109, 84.

However, the wireless communication interfaces 60 or 60C can also be configured in this way. Thus, for example the communication interface 37 of the machine tool 20 can read the communication parameters 85 when it is in proximity to the communication interface 84. A respective energy storage module 40 can also read, using its communication interface 67, the communication parameters 85 from the communication interface 84 and/or 109 or receive said communication parameters therefrom.

In order to establish a control connection of the communication module 300 and/or the energy storage module 40B to the external communication apparatus 100, a communication interface 909 can also be implemented in the shape of for example an NFC transmitter or RFID transmitter. The communication interface 909 is for example arranged on the longitudinal end region 17 of the suction hose 15. For example, the communication interface 909 comprises communication parameters for the first standard which can be read by a corresponding reading communication interface 910 of the vacuum cleaner 70 or 870. The communication interface 109 can for example be an RFID tag, NFC tag or the like. In the case of the communication interface 909, further parameters 911 can also be stored, for example a hose geometry of the suction hose 15, in particular its length and/or diameter, etc., and these further parameters 911 can be read by the communication interface 910.

Furthermore, it is possible that one or a plurality of communication interfaces of the second standard so to speak serve as transfer communication parameters. For example, the communication module 300B can directly read the communication parameters 85 on the vacuum housing 71, namely on the communication interface 84 and/or 109 and then transmit these to the machine tool 20B and/or the energy storage module 40B. The communication module 300B is in this case so to speak an intermediate memory for the communication parameters 85.

A further possibility to switch the external communication apparatus 100 or the vacuum cleaner 70 to the standby mode to establish a control connection, is implemented for example by an acceleration sensor or motion sensor 312. The acceleration sensor 312 sends acceleration signals to the control device 336 which identifies, using the movement signals or reporting signals of the acceleration sensor 312, a typical plug movement or installation movement of the suction hose 15 on the machine tool 20A, 20B. For example, the control device 336 identifies, using the acceleration sensor 312, a typical insert movement, which represents a linear movement and/or rotational movement, which has a predetermined length, namely the insert path when plugging the suction hose 15 on one of the suction outlets 39.

Furthermore, it is possible that using a further motion sensor, which is on board the energy storage module or the machine tool, a movement pattern is identified. Thus, for example the motion sensor 59 of the energy storage module 40 can detect a movement pattern and transmit this via the wireless communication interface 60 to the communication module 300. The communication module 300 compares the movement pattern of the motion sensor 59 with a movement pattern of the motion sensor or acceleration sensor 312. If both movement patterns are identical, this is an indication that the suction hose 15 is fastened or will be fastened to the machine tool 20, for example when the movement patterns are directed in the same manner, but opposingly. Using this information, the communication module 300 can for example establish the control connection S1 or S2. The identification of the movement pattern of the acceleration sensor 312 and/or 59 can thus for example trigger the establishment of a respective control connection S1 or S2 and/or the pairing function, in particular sending the registration message 360.

For the configuration and/or control, a device located outside of the system machine tool, energy storage module, suction hose and vacuum cleaner can also be used, namely for example a configuration apparatus 500. The configuration apparatus 500 is for example a computer, in particular a smartphone, a smartwatch, a tablet computer or the like. The configuration apparatus 500 has a housing 501 which is mobile and independent of the suction hose 15 and vacuum cleaner 70. The housing 501 is also not part of one of the machine tool 20 or the energy storage module 40. However, it would be conceivable that for example a module holder 96 is present on the vacuum cleaner 70 into which the configuration apparatus 500 suitable as a remote control can also be inserted. The configuration apparatus 500 has a display device 502 and an input means 503 to output information for the operator N and to input commands. The input means 503 can be part of the display device 502, for example in the manner of a touchpad.

The configuration device 500 has a control device 506 with a processor 507 and a memory 508. One or a plurality of program modules 509, whose program code can be executed by the processor 507, is stored in the memory 508. Furthermore, a configuration module 510 is stored in the memory 508, which may be suitable to configure the control connections S1-S4. The configuration module 510 has program code which can be executed by the processor 507. The configuration apparatus 500 can directly actuate the vacuum cleaner 70 in the manner of the communication module 300. To this end, for example a communication interface 511 is provided, in particular a Bluetooth interface, WLAN interface or the like, which can communicate directly with the external communication apparatus 100. For example, an input at the input means 503 in the manner of an actuation of one of the registration operating elements 316 or 106 is possible. The configuration apparatus 500 then executes for example program code of the configuration module 510 to switch the external communication apparatus 100 to the standby mode in which the energy storage modules 40 or the machine tool 20 can be authorised to establish the control connection.

Furthermore, the configuration apparatus 500 expediently has a configuration interface 512 with the second standard, for example an RFID interface. Therefore, the configuration apparatus 500 can for example read and/or send the configuration parameters 85.

It should be added at this point that of course the machine tools 20 with their communication interfaces 37 of the second standard and/or the energy storage modules 40 with their communication interfaces 67 can be brought directly in proximity to the vacuum housing 71 and/or the external communication apparatus 100 to read the communication parameters 85 and/or to send their communication parameters.

It should be added at this point that of course the machine tools 20 with their communication interfaces 37 of the second standard and/or the energy storage modules 40 with their communication interfaces 67 can be brought directly in proximity to the vacuum housing 71 and/or the external communication apparatus 100 to read the communication parameters 85 and/or to send their communication parameters. Therefore, the machine tools 20 and the energy storage modules 40, just as the vacuum cleaner 70, also form configurations modules with in each case one communication interface of the first and the second communication standard.

Furthermore, the configuration apparatus 500 is for example suitable for loading software or at least one program module, configuration data or the like in one of the energy storage modules 40 and/or one of the machine tools 20. The wireless communication interfaces 60, 60C communicate in this case preferably directly with the communication interface 511 of the configuration apparatus 500. In this way, for example a program module 49 can be transmitted to an energy storage module 40 or a program module 29 to a machine tool 20. Furthermore, for example configuration data 29A, for example operational parameters and/or machine settings (maximum speed, maximum power, use duration limits or the like), for the machine tool 20 can be transmitted. A program module 29 can be transmitted directly for example via the communication interface 60 to the machine tool 20 or indirectly via an energy storage module 40, i.e. its wireless communication interface 60 and via the data interfaces 34, 54 communicating with one another from the energy storage module 40 to the machine tool 20, in particular its control device 26.

Of course, a gateway function of a machine tool to the energy storage module is also possible, i.e. that for example the wireless communication interface 60C receives a program module 49 for an energy storage module 40 and transmits it via the data interfaces 34, 54 to the energy storage module 40.

In the reverse direction, data of the machine tool 20 can be received for example by the energy storage module 40 and transmitted to the configuration apparatus 500, for example protocol data 29B, in particular data of an error memory, a log file or the like. For example errors occurring during the operation of the machine tool 20, in particular temperature exceedances or the like can be contained in the error memory. The log file contains for example data about the use of the machine tool 20. Using the energy storage module 40, which operates so to speak as a gateway, use duration, error situations or the like can be read from the machine tool 20 using the configuration apparatus 500. The machine tool 20 does not need its own radio interface or other wireless interface.

Controlling information can be sent on the control connections S1-S6, for example switching commands for the suction unit 75, dust class, speed setting, power consumption, contact pressure and particular concentration or dust concentration of a respective machine tool 20. Furthermore, configuration of the vacuum cleaner 70 is possible, i.e. that via one or a plurality of control connections S1-S6 configuration data or reporting data are transmitted from the machine tool 20 and/or the energy storage module 40 to the vacuum cleaner 20, for example stopping time after switching off the suction unit, required power of the suction unit or the like.

The configuration apparatus 500 could be registered according to the function and communication process 400 temporarily at the external communication apparatus 100. However, permanent registration is preferred in the manner of the communication modules 300. The registration operating element 106 for example must be pressed for a long time to authorise or register the configuration apparatus 500 at the vacuum cleaner 70 or the external communication apparatus 100. In this way, it is ensured that only an authorised and legitimate device is registered.

A prioritisation and security concept is presented below:

The components of the system 10 permanently registered at the vacuum cleaner 70 for control are provided for priority actuation of the vacuum cleaner 70, e.g. the mains-connected machine tool 20C and the configuration modules 300 and the configuration apparatus 500. When a switch-on signal or switch-off signal for the suction unit 75 comes from one of these components, this is handled by the vacuum cleaner 70, in particular its control device 86, as a priority over a corresponding control command of the machine tools 20A and 20C equipped with energy storage module 40.

Furthermore, operation at one of the operating elements of the operating element arrangement 77 is a priority. Thus, for example when the switching element 78 is actuated, every other control connection is subordinate.

In the case of the remote controls, i.e. for example the communication modules 300 or the configuration apparatus 500, a one-to-one relationship to the vacuum cleaner 70 is provided. Therefore, a remote control cannot erroneously actuate another vacuum cleaner. Similarly, it is always advantageous when always only one machine tool is authorised with energy storage module at the vacuum cleaner 70 and can actuate it. As soon as further or another machine tool is authorised, the authorisation of the previously authorised machine is erased. Therefore, always only one of the control connections S1 or S2 is possible in the case of the specific exemplary embodiment.

Instead of the current detection of the outlet 79 or in addition thereto, a pressurised air detection could also be provided. Therefore, for example a device operating with pressurised air, for example a grinding machine or polishing machine can be connected to the vacuum cleaner 70. If it is switched on or switched off, the suction unit 75 is running or will be switched off again. A corresponding pressurised air sensor is in this case present on the connection device. The connection device can be a flow device, i.e. that pressurised air is, on the one hand, fed into the vacuum cleaner 70 and, on the other hand, is so to speak tapped from the pressurised air machine not represented in the drawing. If a pressurised air machine or mains machine (machine tool 20C) is switched on and is connected to the vacuum cleaner 70, this has the highest priority. The communication modules 300 and the configuration apparatus 500, like the switching element 78, have a medium priority.

The battery machines or machine tools 20A, 20C provided with energy storage modules have the lowest priority.

It may be advantageous for cancelling an authorisation or ending a control connection S1-S6 for this to be triggered by ending the respective energy supply.

Thus, when for example an energy storage module 40A, 40B is separated from the machine tool 20A, 20B, the control connections S1 or S2 are automatically ended. Also, when the energy supply 310 of the configuration module 300 is removed, the authorisation at the vacuum cleaner 70 is automatically cancelled. In this case, it is advantageous for the energy storage module 40 or the machine tool 20 to send a switching command to switch off the suction unit 75 in the case of such a separation.

A remote control, for example the communication module 300 or the configuration apparatus 500 is expediently registered with a new identity at the external communication apparatus 100 or the wireless interface 60, when the energy supply has ended, for example the energy supply 310 has been removed. Therefore, for example a new encryption can be configured. When a new identity is available, i.e. for example a new address identifier is available, both communication partners are ready to negotiate new encryption parameters. When wireless communication interfaces 60, 60C concurring with one another wish to establish a control connection with the vacuum cleaner 70 or the external communication apparatus 100, the in each case first registered wireless communication interface 60 is for example accepted. Thus, when for example the switching element 24 of the machine tool 20A is pressed before the switching element 24 of the machine tool 20C during the standby mode of the external communication apparatus 100, the control connection S1 is established as a priority.

Furthermore, it is advantageous that in the case of concurring machines the one that can establish the control connection is the one closer to the receiving external communication apparatus 100. In the exemplary embodiment according to FIG. 1, this could be for example the energy storage module 40A which wishes to establish the control connection S1. For example, the wireless communication interface 60 can write into the registration message 440 signal strength information 448 with the signal strength with which it sends the registration message 440.

Using one of the sensors 111 measuring the signal strength, the external communication apparatus 100 can measure the strength of the signal with which the registration message 440 is received, and compare it with the signal strength information 448. The control device 86 can then determine therefrom a value for a distance between the components 40A and 100.

The wireless communication interface 60C or the energy storage module 40B are, however, still remote from the external communication apparatus 100, thus are treated subordinately.

It is also possible that no signal strength information 448 is contained in the registration message 440. In this situation, the sensor 111 can compare the signal strength of the registration message 440 for example with a threshold value.

Furthermore, it is possible that the sensor 111 for example directly compares the signal strengths of the registration messages 440 of the energy storage modules 40A and 40B with one another and responds exclusively or earlier, i.e. with a shorter response time to the registration message 440 which has a greater signal strength.

Figures 13, 16:
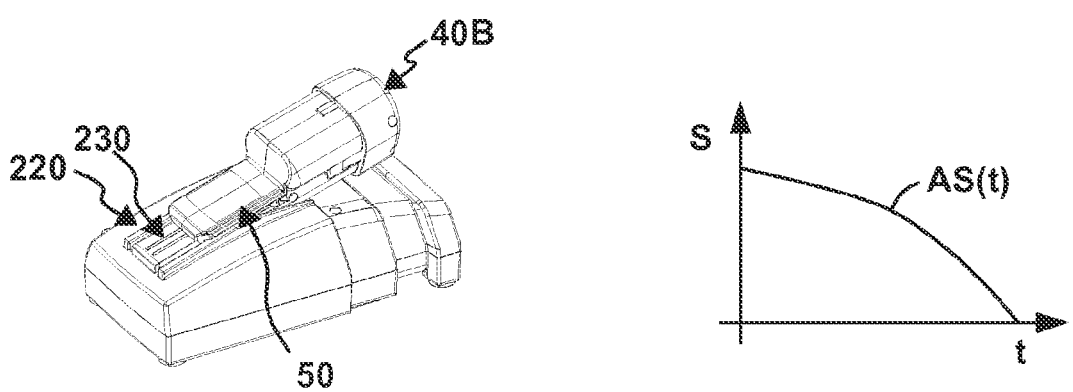
Figure 14:
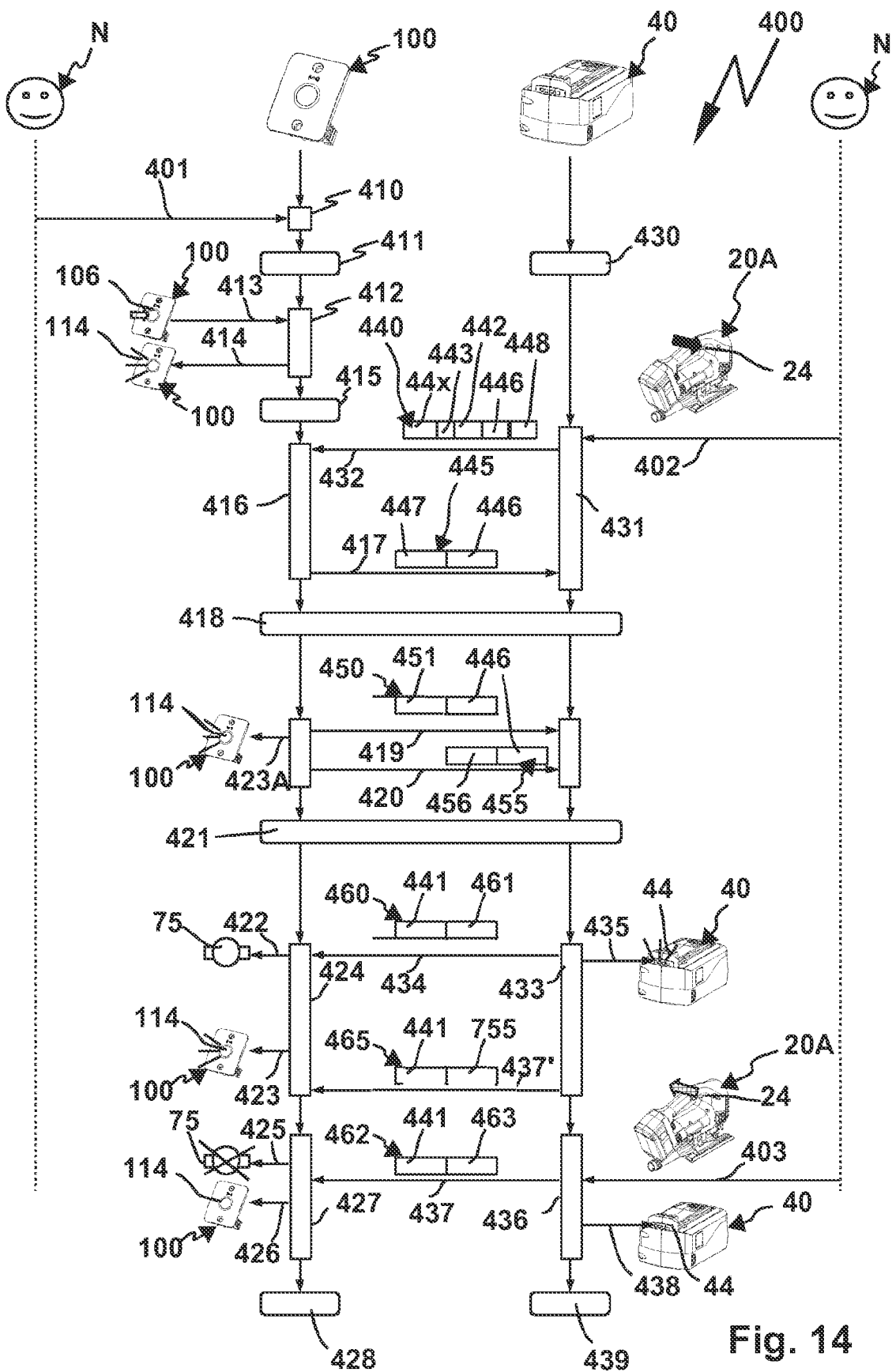

Prioritisation of communication partners arranged closer to the external communication apparatus 100 can for example be provided such that the external communication apparatus 100 sets different response times. This is indicated in FIG. 16. For example, a response time AS(t) is greater or smaller as a function of a signal strength S which the sensor 111 measures. Thus, for example, the external communication apparatus 100 can respond more quickly to the registration message 440 of the energy storage module 40A, which has a greater signal strength, and send a response message, for example the registration confirmation message 445 than to a corresponding registration message 440 of the energy storage module 40B.

It is preferred when the communication parameters stored in the memory 118 of the external communication apparatus 100, for example the address identifiers 446 and 446C and the assigned encryption parameters 451, 451C are erased after a predetermined time and/or after complete separation of the energy supply. Even in the case of the mobile device, namely for example the energy storage module 40A, 40B, it is advantageous for the communication parameters to be erased from the memory 48 after a predetermined time and/or after separation of an energy supply.

Furthermore, it is possible that an authorisation of a mobile device, namely a machine tool 20 or an energy storage module 40 at which the external communication apparatus is erased, i.e. that the control connections S1, S2 are considered erased when the respective machine tool 20, its energy storage module 40 has switched on the vacuum cleaner 70, but another function, for example the switching element 78 or the mains machine tool 20C has switched off the vacuum cleaner again.

Furthermore, it is expedient when the communication parameters at a mobile device, which can establish a control connection, are reset in relation to a charging operation, when for example the energy storage module 40 is connected to the charging device 220, the parameters 441, 451 are erased.

By corresponding actuation of the registration operating element 316 of the communication module 300, for example a correspondingly long pressing, a wireless communication connection can also be established between the communication module 300 and the configuration apparatus 500, e.g. for a software update or the like.

A system represented in FIG. 15 comprises a machine tool 20D which is a mains-connected machine tool or a machine tool operable with an energy storage module 40D. The energy storage module 40D and a further energy storage module 840, which is suitable for operating a vacuum cleaner 870, functionally correspond to the energy storage module 40B. The structure is also discernible from the drawing itself.

The machine tool 20D is for example a grinding device for grinding a workpiece W. Using the suction hose 15 and the connection piece 17, the machine tool 20D can be connected to the vacuum cleaner 870, namely to a suction inlet 872.

The vacuum cleaner 870 is a stackable vacuum cleaner arranged in a stacking box. For example, it has a box-shaped vacuum housing 871 which can be stacked on, under or in a stack, which also has for example containers to store hand-held tools, machine tools, e.g. the machine tool 20D and the like. No further detail is given on the connection components to form such a stack. A plurality of coupling elements 801, for example latches, locks or the like can be discerned for example at the front side of the vacuum housing 871 to couple with a container stacked on top and/or below.

A suction unit 875 in the manner of suction unit 75 is arranged in the interior of the vacuum housing 871, which is closable with a lid. A filter 874 and a dirt collection chamber 873 are also located there, in particular in a container removable from the vacuum housing 871. A device interface 830 is provided on the outside or in the interior of the vacuum housing 871, which is compatible with the device interface 50 of the energy storage module 840 such that the vacuum cleaner 870 is operable with the energy storage module 840.

The energy storage module 840 can now communicate directly with the energy storage module 40D. Thus, the machine tool 20D can actuate via its energy storage module 40D the energy storage module 840D which in turn actuates the vacuum cleaner 870 to switch on and/or switch off the suction unit 875. In this case, the communication takes place via the already explained data interfaces 34, 54 between the respective first and second system components, namely the machine tool 20D and the energy storage module 40D and the vacuum cleaner 870 and the energy storage module 840. It should be mentioned at this point that the registration using for example the registration message 440 is also possible in the case of the system according to FIG. 15. However, it is also possible that the energy storage modules 40D and 840 already represent a communication pair, which is authorised for mutual communication. Therefore, operator interventions are not necessary in order to establish the control connection between the vacuum cleaner and the machine tool.

It is possible that the machine tool 20 and/or the charging device 220 periodically or cyclically switches on the supply voltage UB1 or supply voltage UB2 so that the energy storage module 40 identifies that it is connected to the machine tool 20 or the charging device 220, in particular in the case of the connection to the machine tool 20, when it is switched off, in order to maintain a corresponding control connection to for example the vacuum cleaner 60 or in the case where the connection to the charging device 220 does not have to establish such a control connection.

A preferred design provides for an energy storage module 40 and/or configuration apparatus 500 and/or at least one communication module 300, when there is already an authorisation at the vacuum cleaner 60 or the external communication apparatus 100, to firstly again receive a connection to this so to speak stored vacuum cleaner. An authorisation is in this case already available. In this case, the registration message 440 with the broadcast transmission identifier 44x is so to speak omitted, i.e. a registration message, which is directed to a plurality of essentially ready-to-receive vacuum cleaners, not only the vacuum cleaner 70. Advantageously, a registration message 440 in this case expediently contains an address identifier of the vacuum cleaner 70.

| | | | |
|---|---|---|---|
| 10 | System | 60 | Wireless communication interface |
| 11 | First system component | 61 | Voltage measuring device |
| 12 | Second system component | 62 | Current sensor current sensors |
| 13 | | 63 | Signal strength sensor |
| 14 | | 64 | |
| 15 | Suction hose | 65 | |
| 16 | Longitudinal end | 66 | Capa sensor |
| 17 | Longitudinal end | 67 | Communication interface of second standard RFID |
| 18 | Branch | 68 | Optical sensor proximity sensor |
| 19 | Longitudinal end | 69 | Electric switch |
| 20 | Machine tool AB | 70 | Vacuum cleaner |
| 21 | Machine housing AB | 71 | Vacuum housing 71A, 71B rollers |
| 22 | Drive motor | 72 | Suction inlet |
| 23 | Tool holder AB | 73 | Dirt collection chamber |
| 24 | Switching element | 74 | Filter |
| 24A | Switch | 75 | Suction unit |
| 25 | Switching element | 76 | Mains connection device |
| 26 | Control device | 77 | Operating element arrangement |
| 27 | Processor | 78 | Switching element |
| 28 | Memory | 78A | Switching element |
| 29 | Program modules | 79 | Outlet |
| 30 | Device interface | 80 | Contacts |
| 31 | Plug counter positive-locking contours | 81 | Current sensor |
| 32 | Device supply contacts | 82 | Input/output interface |

-continued

| | | | |
|---|---|---|---|
| 33 | Data contacts | 83 | Data interface for 100 |
| 34 | Data interface | 84 | Communication interface of second standard RFID |
| 35 | Fixing contour | 85 | Communication parameters |
| 36 | Capa sensor | 86 | Control device |
| 37 | Communication interface of second standard RFID | 87 | Processor |
| 38 | Tool | 88 | Memory |
| 39 | Suction outlet | 89 | Program modules |
| 40 | Energy storage module AB | 90 | Module holder |
| 41 | Module housing AB | 91 | Contact arrangement |
| 42 | Energy storage device | 92 | Side walls |
| 43 | Storage cell | 93 | Bottom |
| 44 | Display device charge status | 94 | Screw holder |
| 45 | Lights LED 44A speaker | 95 | Front wall of 77 |
| 46 | Control device | 96 | Module holder |
| 47 | Processor | 97 | |
| 48 | Memory | 98 | |
| 49 | Program modules | 99 | |
| 50 | Device interface | 100 | External communication apparatus |
| 51 | Plug positive-locking contours | 101 | Contact arrangement |
| 52 | Supply contacts | 102 | Side wall surfaces |
| 53 | Data contacts | 103 | Rear side |
| 54 | Data interface | 104 | Screw holder |
| 55 | Fixing device | 105 | Front wall |
| 56 | Fixing element | 106 | Registration operating element |
| 57 | Actuation element | 107 | Button |
| 58 | Sensor for 57 | 108 | Data interface for 86 |
| 59 | Motion sensor | 109 | Communication interface of second standard RFID |
| | | 110 | Communication interface |
| 30C | Mains connection device | 111 | |
| 31C | Plug | 112 | |
| 32C | Contacts | 113 | |
| | | 114 | Display device |
| 220 | Charging device | 115 | |
| 221 | Charging device housing | 116 | Control device |
| 226 | Control device | 117 | Processor |
| 227 | Processor | 118 | Memory |
| 228 | Memory | 119 | Program modules |
| 229 | Program module | UV | Supply voltage |
| 230 | Device interface | VD | Supply line |
| 231 | Plug counter positive-locking contours | CL | Clock line |
| 232 | Device supply contacts | D | Data line |
| 233 | Data contacts | UB | Bus voltage |
| 234 | Data interface | BU | Bus |
| 235 | Voltage transformer | IL | Charging current |
| 236 | Mains connection device | N | Operator |
| 237 | Connection plug | EV | Supply network |
| 238 | Switch | | |
| 300 | Communication module | 500 | Configuration apparatus |
| 301 | Module housing | 501 | Housing |
| 302 | Upper side wall | 502 | Display device display |
| 303 | Forward side wall | 503 | Input means |
| 304 | Rear side wall | | |
| 305 | Longitudinal side wall | 506 | Control device |
| 306 | Lower side wall | 507 | Processor |
| 307 | Hook | 508 | Memory |
| 308 | Hook projection | 509 | Program module |
| 309 | Hook depression | 510 | Configuration module |
| 310 | Energy supply/button cell | 511 | Communication interface |
| 311 | Communication interface | 512 | Communication interface of second standard RFID |
| 312 | Acceleration sensor | | |
| 314 | Display device | | |
| 316 | Registration operating element | | |
| 317 | Button | | |
| 318 | Communication interface of second standard RFID | 700 | Request message charging device |
| | | 701 | Response message charging device |
| 320 | Hose bracket | | |
| 321 | Clamping point | | |
| 322 | Longitudinal end regions | 750 | Request message machine tool |
| 323 | Hook holder | 751 | Identifier |
| 334 | Switching element/on switch | 752 | Response message |
| 335 | Switching element/speed | 753 | Message motor switch off |
| 336 | Control device | 754 | Configuration message |
| 337 | Processor | 755 | Configuration data |
| 338 | Memory | 430 | Status sleep |

-continued

| | | | |
|---|---|---|---|
| 339 | Program module | 431 | Function |
| | | 432 | Transmission operation |
| | | 433 | Function switch on |
| 400 | Function and communication process | 434 | Transmission operation |
| 401 | Step | 435 | Activation step display |
| 403 | Operating step | 436 | Function switch off |
| 410 | Status in operation | 437 | Transmission operation |
| 411 | Status searching for authorised devices | 438 | Deactivation step display |
| | | 439 | Status sleep |
| 412 | Function | 440 | Registration message |
| 413 | Step | 44x | Broadcast transmission identifier |
| 414 | Output command | 441 | Address identifier vacuum cleaner |
| 415 | Status standby mode | 442 | Authorisation parameter |
| 416 | Function | 443 | Temporary identifier |
| 417 | Transmission operation | | |
| 418 | Status connected | 445 | Registration confirmation message |
| 419 | Transmission operation | 446 | Address identifier energy storage device |
| 420 | Transmission operation | 447 | Information |
| 421 | Encrypted connection | 448 | Signal strength information |
| | | 450 | Message existing encryption |
| 422 | Step | 451 | Encryption parameter |
| 423 | Step | 455 | Message new encryption |
| | | 456 | Encryption parameter |
| 425 | Actuation suction unit | 460 | Control command switch on |
| 426 | Actuation display | 461 | Switch-on identifier |
| 427 | Function shut down | 462 | Control command switch off |
| 428 | Status searching for authorised devices | 463 | Shut-down identifier |
| | | 465 | Configuration message |

The invention claimed is:

1. An external communication apparatus as part of a vacuum cleaner, the external communication apparatus comprising:
a communication interface for wirelessly communicating with an external electric device,
wherein the vacuum cleaner is actuatable by the external electric device,
wherein the external electric device is one of a machine tool or an energy storage module for an electric power supply of a machine tool,
wherein the external communication apparatus and the external electric device form a system,
wherein the energy storage module has a module housing with a device interface for a detachable connection to the machine tool,
wherein the machine tool has a drive motor to drive a tool holder on which a tool provided to process a workpiece is arranged or is arrangeable, the drive motor being switchable using a switching element of the machine tool and/or the energy storage module,
wherein the communication interface of the external communication apparatus is designed for wireless communication with a wireless communication interface of the external electric device and is designed to receive at least one control command to switch on and/or switch off the vacuum cleaner as a function of a switching status of the switching element from the wireless communication interface of the external electric device via a wireless control connection, and
wherein the communication interface of the external communication apparatus is designed to receive at least one registration message from the wireless communication interface of the external electric device to establish the wireless control connection, and
wherein the external communication apparatus is ready in a standby mode to receive the at least one registration message and the external communication apparatus is not ready in an operating mode to receive the at least one registration message, and
wherein the external communication apparatus is designed in the standby mode to send at least one request message to request the external electric device to send the at least one registration message to the external communication apparatus.

2. The external communication apparatus according to claim 1, wherein the external communication apparatus is switched using a registration operating element into the standby mode and/or wherein the external communication apparatus switches into the standby mode after connecting the vacuum cleaner to an electric energy supply for the vacuum cleaner.

3. The external communication apparatus according to claim 1, further comprising optical and/or acoustic display means to display the standby mode and/or the apparatus ends the standby mode after a predetermined or determinable time.

4. The external communication apparatus according to claim 1, wherein the external communication apparatus is designed to establish at least one wireless control connection to an operating device in a permanent category and is further designed to establish the wireless control connection to the external electric device as a control connection of a non-permanent category.

5. The external communication apparatus according to claim 4, wherein only a single wireless control connection of the non-permanent category is established with the external communication apparatus and/or wherein the control connection of the non-permanent category is reserved only to a device to actuate the vacuum cleaner from the machine tool or the energy storage module.

6. The external communication apparatus according to claim 4, wherein a first operating action at the external communication apparatus is required to establish the wireless control connection of the non-permanent category and the wireless control connection of the permanent category is established by a second operating action different compared to the first operating action, and/or is established by a permanent setting, using an electric registration operating element or using a setting settable by software.

7. The external communication apparatus according to claim 1, wherein the external communication apparatus ends the wireless control connection with the external electric device after a predetermined or settable time and/or in the case of switching off the vacuum cleaner and/or in the case of separating the vacuum cleaner from an electric energy supply.

8. The external communication apparatus according to claim 1, wherein the external communication apparatus is designed to establish the wireless control connection as a function of the signal strength of a signal sent by the wireless communication interface containing the at least one registration message, wherein the external communication apparatus signals the wireless communication interface in the case of a distance between the wireless communication interface and the external communication apparatus of less than 1 meter to prioritise the at least one registration message for an immediate establishment of the control connection and/or wherein the external communication apparatus prefers, in the case of external electric devices concurring with one another to establish the control connection, the external electric device with a highest signal strength to establish the control connection and/or wherein the external communication apparatus sets a registration confirmation message to the at least one registration message as a function of the signal strength of the signal of the wireless communication interface.

9. The external communication apparatus according to claim 1, wherein the external communication apparatus ends a suction operation when the wireless control connection is interrupted and/or the external communication apparatus does not obtain any control command within a predetermined or determinable time from the external electric device.

10. The external communication apparatus according to claim 1, wherein the external communication apparatus is designed to receive at least one configuration message for a configuration, of a working position and/or a suction power, of the vacuum cleaner as a function of a variable characterising the external electric device.

11. The external communication apparatus according to claim 1, further comprising a memory to store authorisation parameters or registration parameters and/or encryption parameters to establish control connections to at least two electric devices and wireless communication interfaces of the at least two electric devices.

12. The external communication apparatus according to claim 1, wherein the external communication apparatus is actuatable by at least one remote control device in addition to the at least one wireless control connection.

13. The external communication apparatus according to claim 1, wherein the external communication apparatus is designed to prioritise the at least one control command generated by a control operating element different from the external electric device to switch on and/or switch off the vacuum cleaner with respect to the wireless control connection, wherein the control command forms a priority control command.

14. The external communication apparatus according to claim 13, wherein the control operating element comprises a switching element on the vacuum cleaner and/or a remote control device assigned to the vacuum cleaner or forming part of the vacuum cleaner.

15. An external communication apparatus as part of a vacuum cleaner, the external communication apparatus comprising:
  a communication interface for wirelessly communicating with an external electric device,
  wherein the vacuum cleaner is actuatable by the external electric device,
  wherein the external electric device is one of a machine tool or an energy storage module for an electric power supply of a machine tool,
  wherein the external communication apparatus and the external electric device form a system,
  wherein the energy storage module has a module housing with a device interface for a detachable connection to the machine tool,
  wherein the machine tool has a drive motor to drive a tool holder on which a tool provided to process a workpiece is arranged or is arrangeable, the drive motor being switchable using a switching element of the machine tool and/or the energy storage module,
  wherein the communication interface of the external communication apparatus is designed for wireless communication with a wireless communication interface of the external electric device and is designed to receive at least one control command to switch on and/or switch off the vacuum cleaner as a function of a switching status of the switching element from the wireless communication interface of the external electric device via a wireless control connection,
  wherein the communication interface of the external communication apparatus is designed to receive at least one registration message from the wireless communication interface of the external electric device to establish the wireless control connection, and
  wherein the external communication apparatus is designed to establish the wireless control connection as a function of the signal strength of a signal sent by the wireless communication interface containing the at least one registration message, wherein the external communication apparatus signals the wireless communication interface in the case of a distance between the wireless communication interface and the external communication apparatus of less than 1 meter, to prioritise the at least one registration message for an immediate establishment of the control connection and/or wherein the external communication apparatus prefers, in the case of external electric devices concurring with one another to establish the control connection, the external electric device with a highest signal strength to establish the control connection and/or wherein the external communication apparatus sets a registration confirmation message to the at least one registration message as a function of the signal strength of the signal of the wireless communication interface.

16. The external communication apparatus according to claim 15, wherein the external communication apparatus is ready in a standby mode to receive the at least one registration message and the external communication apparatus is not ready in an operating mode to receive the at least one registration message.

17. The external communication apparatus according to claim 16, wherein the external communication apparatus is designed in the standby mode to send at least one request message to request the external electric device to send the at least one registration message to the external communication apparatus.

18. An external communication apparatus as part of a vacuum cleaner, the external communication apparatus comprising:
- a communication interface for wirelessly communicating with an external electric device,
- wherein the vacuum cleaner is actuatable by the external electric device,
- wherein the external electric device is one of a machine tool or an energy storage module for an electric power supply of a machine tool,
- wherein the external communication apparatus and the external electric device form a system,
- wherein the energy storage module has a module housing with a device interface for a detachable connection to the machine tool,
- wherein the machine tool has a drive motor to drive a tool holder on which a tool provided to process a workpiece is arranged or is arrangeable, the drive motor being switchable using a switching element of the machine tool and/or the energy storage module,
- wherein the communication interface of the external communication apparatus is designed for wireless communication with a wireless communication interface of the external electric device and is designed to receive at least one control command to switch on and/or switch off the vacuum cleaner as a function of a switching status of the switching element from the wireless communication interface of the external electric device via a wireless control connection,
- wherein the communication interface of the external communication apparatus is designed to receive at least one registration message from the wireless communication interface of the external electric device to establish the wireless control connection, and
- wherein the external communication apparatus further comprises a memory to store authorisation parameters or registration parameters and/or encryption parameters to establish control connections to at least two electric devices and their-wireless communication interfaces of the at least two electric devices.

19. An external communication apparatus as part of a vacuum cleaner, the external communication apparatus comprising:
- a communication interface for wirelessly communicating with an external electric device,
- wherein the vacuum cleaner is actuatable by the external electric device,
- wherein the external electric device is one of a machine tool or an energy storage module for an electric power supply of a machine tool,
- wherein the external communication apparatus and the external electric device form a system,
- wherein the energy storage module has a module housing with a device interface for a detachable connection to the machine tool,
- wherein the machine tool has a drive motor to drive a tool holder on which a tool provided to process a workpiece is arranged or is arrangeable, the drive motor being switchable using a switching element of the machine tool and/or the energy storage module,
- wherein the communication interface of the external communication apparatus is designed for wireless communication with a wireless communication interface of the external electric device and is designed to receive at least one control command to switch on and/or switch off the vacuum cleaner as a function of a switching status of the switching element from the wireless communication interface of the external electric device via a wireless control connection,
- wherein the communication interface of the external communication apparatus is designed to receive at least one registration message from the wireless communication interface of the external electric device to establish the wireless control connection, and
- wherein the external communication apparatus is designed to prioritise the at least one control command generated by a control operating element different from the external electric device to switch on and/or switch off the vacuum cleaner with respect to the wireless control connection, wherein the control command forms a priority control command.

* * * * *